US010929172B2

(12) United States Patent
Bugenhagen

(10) Patent No.: US 10,929,172 B2
(45) Date of Patent: *Feb. 23, 2021

(54) MULTI-LINE/MULTI-STATE VIRTUALIZED OAM TRANSPONDER

(71) Applicant: CenturyLink Intellectual Property LLC, Broomfield, CO (US)

(72) Inventor: Michael K. Bugenhagen, Leawood, KS (US)

(73) Assignee: CenturyLink Intellectual Property LLC, Broomfield, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/839,374

(22) Filed: Apr. 3, 2020

(65) Prior Publication Data
US 2020/0233695 A1    Jul. 23, 2020

Related U.S. Application Data

(63) Continuation of application No. 15/853,467, filed on Dec. 22, 2017, now Pat. No. 10,613,892, which is a
(Continued)

(51) Int. Cl.
*G06F 9/455*    (2018.01)
*H04L 12/26*    (2006.01)

(52) U.S. Cl.
CPC .......... *G06F 9/45558* (2013.01); *H04L 43/08* (2013.01); *G06F 2009/45595* (2013.01)

(58) Field of Classification Search
None
See application file for complete search history.

(56) References Cited

U.S. PATENT DOCUMENTS 6,182,275 B1    1/2001  Beelitz et al.
6,427,150 B1    7/2002  Oashi
(Continued)

FOREIGN PATENT DOCUMENTS

EP    2017711    1/2008
EP    2972859    1/2016
(Continued)

OTHER PUBLICATIONS

"EP Patent App. No. 14768226.4; Supplementary European Search Report dated Nov. 29, 2016; 10 pages".
(Continued)

*Primary Examiner* — Lewis A Bullock, Jr.
*Assistant Examiner* — Melissa A Headly

(57) ABSTRACT

Novel tools and techniques might provide for implementing applications management, based at least in part on operations, administration, and management ("OAM") information. A host computing system might comprise a dedicated OAM management agent. While normal application frame flow might be sent or received by VMs running on the host computing system, OAM frame flow might be sent or received by the OAM management agent, which might also serve as an OAM frame generator. Alternatively, or additionally, based on a determination that at least one OAM frame has changed (in response to a change in address of far-end and/or near-end OAM server functions), the OAM management agent might update a list associating the at least one OAM frame that has changed with corresponding at least one VM of the one or more VMs, without restarting any of the at least one VM, the OAM management agent, and/or the host computing system.

18 Claims, 13 Drawing Sheets

Related U.S. Application Data continuation of application No. 14/583,952, filed on Dec. 29, 2014, now Pat. No. 9,898,318.

(60) Provisional application No. 62/038,201, filed on Aug. 15, 2014.

(56) References Cited

U.S. PATENT DOCUMENTS

| | | |
|---|---|---|
| 6,560,641 B1 | 5/2003 | Powderly et al. |
| 6,577,327 B1 | 6/2003 | Rochford et al. |
| 7,664,115 B1 | 2/2010 | Robotham |
| 7,672,923 B1 | 3/2010 | Reed |
| 7,693,079 B2 | 4/2010 | Cerami et al. |
| 7,953,865 B1 | 5/2011 | Miller et al. |
| 8,051,382 B1 | 11/2011 | Kingdom et al. |
| 8,103,480 B2 | 1/2012 | Korn et al. |
| 8,223,655 B2 | 7/2012 | Heinz |
| 8,462,632 B1 | 6/2013 | Vincent |
| 8,588,081 B2 * | 11/2013 | Salam ............... H04L 43/0811 370/242 |
| 8,717,895 B2 | 5/2014 | Koponen et al. |
| 8,750,288 B2 | 6/2014 | Nakil et al. |
| 8,755,377 B2 | 6/2014 | Nakil et al. |
| 8,881,142 B1 | 11/2014 | Reid |
| 8,953,441 B2 | 2/2015 | Nakil et al. |
| 8,959,185 B2 | 2/2015 | Nakil et al. |
| 9,098,214 B1 | 8/2015 | Vincent et al. |
| 9,141,416 B2 | 9/2015 | Bugenhagen |
| 9,158,565 B2 | 10/2015 | Jakoljevic et al. |
| 9,185,170 B1 | 11/2015 | Grammel |
| 9,231,892 B2 | 1/2016 | Baphna |
| 9,250,863 B1 | 2/2016 | Vincent et al. |
| 9,356,883 B1 | 5/2016 | Borthakur |
| 9,386,001 B1 | 7/2016 | Marquardt et al. |
| 9,417,902 B1 | 8/2016 | Noonan |
| 9,430,259 B2 | 8/2016 | Bugenhagen |
| 9,495,188 B1 | 11/2016 | Ettema et al. |
| 9,582,305 B2 | 2/2017 | Bugenhagen |
| 9,658,868 B2 | 5/2017 | Hill |
| 9,703,598 B2 | 7/2017 | Vincent et al. |
| 9,898,318 B2 | 2/2018 | Bugenhagen |
| 2002/0152305 A1 | 10/2002 | Jackson et al. |
| 2003/0055919 A1 | 3/2003 | Fong |
| 2004/0015966 A1 | 1/2004 | Macchiano et al. |
| 2005/0144288 A1 | 6/2005 | Liao |
| 2005/0228921 A1 | 10/2005 | Sethi et al. |
| 2006/0233144 A1 | 10/2006 | Matsumoto |
| 2006/0235973 A1 | 10/2006 | McBride et al. |
| 2007/0061433 A1 | 3/2007 | Reynolds |
| 2007/0094085 A1 | 4/2007 | Redmond et al. |
| 2007/0165818 A1 | 7/2007 | Savoor et al. |
| 2007/0230358 A1 | 10/2007 | Narayanan et al. |
| 2008/0002676 A1 | 1/2008 | Wiley |
| 2008/0049639 A1 | 2/2008 | Wiley et al. |
| 2008/0049640 A1 | 2/2008 | Heinz et al. |
| 2008/0049927 A1 | 2/2008 | Wiley |
| 2008/0052387 A1 | 2/2008 | Heinz et al. |
| 2008/0155537 A1 | 6/2008 | Dinda et al. |
| 2008/0259794 A1 | 10/2008 | Zou et al. |
| 2009/0092151 A1 | 4/2009 | Raguet et al. |
| 2009/0187654 A1 | 7/2009 | Raja et al. |
| 2009/0204965 A1 | 8/2009 | Tanaka et al. |
| 2009/0217267 A1 | 8/2009 | Gebhart |
| 2009/0292858 A1 | 11/2009 | Lambeth et al. |
| 2010/0023623 A1 | 1/2010 | Saffre et al. |
| 2010/0027552 A1 | 2/2010 | Hill |
| 2010/0043068 A1 | 2/2010 | Varadhan et al. |
| 2010/0071035 A1 | 3/2010 | Budko |
| 2010/0100640 A1 | 4/2010 | Nakao |
| 2010/0122334 A1 | 5/2010 | Stanzione et al. |
| 2010/0162238 A1 | 6/2010 | Warfield |
| 2010/0192152 A1 | 7/2010 | Miyamoto et al. |
| 2010/0217837 A1 | 8/2010 | Ansari |
| 2010/0235580 A1 | 9/2010 | Bouvier |
| 2010/0306763 A1 | 12/2010 | Lambert et al. |
| 2011/0134930 A1 | 6/2011 | McLaren |
| 2011/0209157 A1 | 8/2011 | Sumida et al. |
| 2011/0222412 A1 | 9/2011 | Kompella |
| 2011/0231551 A1 | 9/2011 | Hassan et al. |
| 2011/0252418 A1 | 10/2011 | Havivi et al. |
| 2011/0276951 A1 | 11/2011 | Jain |
| 2011/0296234 A1 | 12/2011 | Oshins et al. |
| 2011/0310899 A1 | 12/2011 | Alkhatib et al. |
| 2011/0314469 A1 | 12/2011 | Qian et al. |
| 2012/0042040 A1 | 2/2012 | Bailey et al. |
| 2012/0072909 A1 | 3/2012 | Malik et al. |
| 2012/0089845 A1 | 4/2012 | Raleigh |
| 2012/0151087 A1 | 6/2012 | Azam |
| 2012/0151277 A1 | 6/2012 | Jung et al. |
| 2012/0167083 A1 | 6/2012 | Suit |
| 2012/0174099 A1 | 7/2012 | Ashok et al. |
| 2012/0304175 A1 | 11/2012 | Damola et al. |
| 2012/0307684 A1 | 12/2012 | Biswas et al. |
| 2012/0331461 A1 | 12/2012 | Fries et al. |
| 2013/0003538 A1 | 1/2013 | Greenberg et al. |
| 2013/0031543 A1 | 1/2013 | Angus |
| 2013/0058215 A1 | 3/2013 | Koponen et al. |
| 2013/0061297 A1 | 3/2013 | Larsen et al. |
| 2013/0147906 A1 | 6/2013 | Weiser et al. |
| 2013/0191850 A1 | 7/2013 | Fischer et al. |
| 2013/0204971 A1 | 8/2013 | Brandwine et al. |
| 2013/0212600 A1 | 8/2013 | Harsh et al. |
| 2013/0227670 A1 | 8/2013 | Ahmad et al. |
| 2013/0254424 A1 | 9/2013 | Guay et al. |
| 2013/0262652 A1 | 10/2013 | Vuyk et al. |
| 2013/0275968 A1 | 10/2013 | Petev et al. |
| 2013/0332926 A1 | 12/2013 | Jakoljevic et al. |
| 2014/0012966 A1 | 1/2014 | Baphna |
| 2014/0016924 A1 | 1/2014 | Gonzalez |
| 2014/0123140 A1 | 5/2014 | Motoki |
| 2014/0164618 A1 | 6/2014 | Alicherry et al. |
| 2014/0189050 A1 | 7/2014 | Rijsman et al. |
| 2014/0201374 A1 * | 7/2014 | Ashwood-Smith ..... H04L 49/70 709/226 |
| 2014/0282528 A1 | 9/2014 | Bugenhagen |
| 2014/0282529 A1 | 9/2014 | Bugenhagen |
| 2014/0307744 A1 | 10/2014 | Dunbar et al. |
| 2014/0313984 A1 | 10/2014 | Diamond |
| 2014/0321260 A1 | 10/2014 | Mishra et al. |
| 2014/0347979 A1 | 11/2014 | Tanaka |
| 2014/0359556 A1 | 12/2014 | Jujare et al. |
| 2014/0372788 A1 | 12/2014 | Vavrick et al. |
| 2015/0049601 A1 | 2/2015 | Bugenhagen |
| 2015/0074793 A1 | 3/2015 | Dalvi et al. |
| 2015/0088825 A1 | 3/2015 | Bloom et al. |
| 2015/0089331 A1 | 3/2015 | Skerry et al. |
| 2015/0117454 A1 | 4/2015 | Koponen et al. |
| 2015/0143368 A1 | 5/2015 | Bugenhagen |
| 2015/0150020 A1 | 5/2015 | Duttagupta et al. |
| 2015/0207699 A1 | 7/2015 | Fargano et al. |
| 2015/0244617 A1 | 8/2015 | Nakil et al. |
| 2015/0288541 A1 | 10/2015 | Fargano et al. |
| 2015/0288622 A1 | 10/2015 | Fargano et al. |
| 2015/0288767 A1 | 10/2015 | Fargano et al. |
| 2015/0324220 A1 | 11/2015 | Bugenhagen |
| 2015/0339156 A1 | 11/2015 | Vincent et al. |
| 2015/0365281 A1 | 12/2015 | Marino et al. |
| 2016/0006696 A1 | 1/2016 | Donley et al. |
| 2016/0048403 A1 | 2/2016 | Bugenhagen |
| 2016/0050159 A1 | 2/2016 | Cook et al. |
| 2016/0087859 A1 | 3/2016 | Kuan et al. |
| 2016/0197779 A1 | 7/2016 | Soejima |
| 2016/0301668 A1 | 10/2016 | Marquardt et al. |
| 2016/0337206 A1 | 11/2016 | Bugenhagen et al. |
| 2016/0337270 A1 | 11/2016 | Heinonen et al. |
| 2017/0093750 A1 | 3/2017 | McBride et al. |
| 2017/0097834 A1 | 4/2017 | Cropper et al. |
| 2017/0123839 A1 | 5/2017 | Bugenhagen |
| 2017/0177396 A1 | 6/2017 | Palermo |
| 2018/0123974 A1 | 5/2018 | McBride et al. |
| 2018/0150314 A1 | 5/2018 | Bugenhagen |

(56) References Cited

U.S. PATENT DOCUMENTS

| | | |
|---|---|---|
| 2018/0157515 A1 | 6/2018 | Malloy |
| 2018/0157523 A1 | 6/2018 | Bugenhagen |
| 2018/0159771 A1 | 6/2018 | Malloy |

FOREIGN PATENT DOCUMENTS

| | | |
|---|---|---|
| KR | 10-2012-0060014 | 6/2012 |
| KR | 10-2013-0093717 | 8/2013 |
| KR | 10-1472013 | 12/2014 |
| KR | 10-1475925 | 12/2014 |
| KR | 20-140145645 | 12/2014 |
| WO | WO-2014110453 | 7/2014 |
| WO | WO-2014/150715 | 9/2014 |
| WO | WO-2014150715 | 9/2014 |
| WO | WO-2015077460 | 5/2015 |
| WO | WO-2015-126430 | 8/2015 |
| WO | WO-2016025497 | 2/2016 |
| WO | WO-2016025501 | 2/2016 |
| WO | WO-2017023396 | 2/2017 |
| WO | WO-2017058350 | 4/2017 |
| WO | WO-2017062344 | 4/2017 |
| WO | WO-2017146768 | 8/2017 |

OTHER PUBLICATIONS

"ETSI Group Specification (Oct. 2013), "Network Functions Virtualisation (NFV); Use Cases" ; 50 pages".
"European Examination Report, dated Mar. 15, 2018", Application No. 14768226.4, filed Mar. 12, 2014; 6 pgs.
"European Invitation to Rule 62a(1) EPC", Application No. 15832649.6, filed Aug. 11, 2015; 3 pgs.
"Extended European Search Report, dated Nov. 21, 2017", Application No. 14864171.5, filed May 11, 2016; 6 pgs.
"Henrik Basilier et al. Ericsson Review. Virtualizing network services— the telecom cloud, Mar. 28, 2014, Retrieved from the Internet: <http://www.ericsson.com/res/thecompany/docs/publications/ericssor_review/2014/er-telecom-cloud.pdf> ISSN 0014-0171. pp. 1-9".
"International Application No. PCT/US2014/024050; International Preliminary Report on Patentability dated Sep. 24, 2015; 6 pages".
"International Application No. PCT/US2014/066628; International Preliminary Report on Patentability dated Jun. 2, 2016; 7 pages".
"International Application No. PCT/US2015/044682; International Preliminary Report on Patentability dated Mar. 2, 2017; 10 p.".
"International Application No. PCT/US2015/044682; International Search Report and Written Opinion dated Nov. 16, 2015; 13 pages".
"International Application No. PCT/US2015/044690; International Preliminary Report on Patentability dated Feb. 23, 2017; 9 p.".
International Application No. PCT/US2015/044690; International Search Report and Written Opinion dated Dec. 4, 2015; 12 pages.
International Application No. PCT/US2016/044882; International Search Report and Written Opinion dated Nov. 7, 2016; 11 pages.
International Preliminary Report on Patentability dated Apr. 10, 2018, Int'l Appl. No. PCT/US16/055293, Int'l Filing Date Oct. 4, 2016; 9 pgs.
International Search Report and Written Opinion prepared by the Korean Intellectual Property Office as International Searching Authority for PCT Intl Patent App. No. PCT/US2014/024050 dated Jun. 27, 2014; 9 pages.
International Search Report and Written Opinion prepared by the Korean Intellectual Property Office as International Searching Authority for PCT Intl Patent App. No. PCT/US2014/066628 dated Mar. 10, 2015; 10 pages.
International Search Report and Written Opinion prepared by the Korean Intellectual Property Office as International Searching Authority for PCT Intl Patent App. No. PCT/US2016/044867 dated Nov. 23, 2016; 13 pages.
International Search Report and Written Opinion prepared by the Korean Intellectual Property Office as International Searching Authority for PCT Intl Patent App. No. PCT/US2016/055293 dated Jan. 11, 2017; 12 pages.
"RAD Launches vCPE Platform for Hosting VNFs", LightReading (Mar. 17, 2015). Web Site www.lightreading.com/nfv/nfv-elements/rad-launches-vcpe-platform-for-hosting-vnfs. Accessed Sep. 8, 2015 , 1 pg.
Stuart Clayman et al. "The Dynamic Placement of Virtual Network Functions" In: 2014 IEEE Network Operations and Management Symposium (NOMS), May 5-9, 2014, pp. 1-9.
Wikipedia (Oct. 2014), "Network Functions Virtualization" http://en.wikipedia.org/wiki/Network_Functions_virtualization; accessed on Oct. 23, 2014; 5 pages.
Batalle, Josep et al., "On the Implementation of NFV over an OpenFlow Infrastructure: Routing Function Virtualization"; Nov. 11, 2013; 3 pages.
Bohoris, Christos "Network Performance Management Using Mobile Software Agents", Centre for Communications Systems Research School of Electronics and Physical Sciences; University of Surrey, UK Jun. 2003 , 188 pgs.
Gowan, Bo Ciena unveils a carrier-grade CPE for NFV., Web Site www.ciena.com/connect/blog/Ciena-unveils-a-carrier-grade-CPE-for-NFV.html. Accessed Sep. 8, 2015 Jun. 22, 2015 , 4 pgs.
Kang, et al., "Optimizing the "One Big Switch" Abstraction in Software-Defined Networks", ACM, CoNEXT'13; <http://dl.acm.org/citation.cfm?id=2535373&CFIC=968133826&CFTOKEN=57638951> Dec. 2013 , pp. 13-24.
Metzler, Jim et al., "The 2013 Guide to Network Virtualization and SDN"; https://www.avaya.com/en/documents/the_2013_guide_to-network_virtualization_and_sdn.pdf; Dec. 2013; 6 pages.
Vilalta, et al., "Network Virtualization Controller for Abstraction and Control of Open-Flow-enabled Multi-tenant Multi-technology Transport Networks", *IEEE*; <http://ieeexplore.ieee.org/stamp/stamp.jsp?arnumber=7121738> Jun. 2015 , pp. 103.
Yu, et al., "What SDN will Bring for Transport Networks?", Open Networking Summit 2014, <https://www.usenix.org/sites/default/files/ons2014-poster-yu.pdf> Mar. 2014 , pp. 1-2.

* cited by examiner

1100

MULTI-LINE/MULTI-STATE VIRTUALIZED OAM TRANSPONDER

CROSS-REFERENCES TO RELATED APPLICATIONS

This application is a continuation of U.S. patent application Ser. No. 14/583,952 (the "'952 application"), filed Dec. 29, 2014 by Michael K. Bugenhagen, entitled, "Multi-line/Multi-state Virtualized OAM Transponder." which claims priority to U.S. Patent Application Ser. No. 62/038,201 (the "'201 application"), filed Aug. 15, 2014 by Michael K. Bugenhagen, entitled, "Multi-line/Multi-state Virtualized OAM Transponder," the entire teachings of which are incorporated herein by reference in its entirety.

This application may be related to U.S. patent application Ser. No. 14/061,147 (the "'147 application"), filed Oct. 23, 2013 by Michael K. Bugenhagen, entitled, "Virtualization Congestion Control Framework," which is a continuation-in-part application of U.S. patent application Ser. No. 14/060,450 (the "'450 application"), filed Oct. 22, 2013 by Michael K. Bugenhagen, entitled, "Virtualization Congestion Control Framework," which claims benefit of priority to provisional U.S. Patent Application Ser. No. 61/788,256 (the "'256 application"), filed Mar. 15, 2013 by Michael K. Bugenhagen, entitled, "Virtualization Congestion Control Framework." This application may also be related to U.S. patent application Ser. No. 14/460,085 (the "'085 application"), filed Aug. 14, 2014 by Michael K. Bugenhagen, entitled, "Ethernet Carrier Group Alarm (CGA)," which claims benefit of priority to provisional U.S. Patent Application Ser. No. 61/865,865 (the "'865 application"), filed Aug. 14, 2013 by Michael K. Bugenhagen, entitled, "Ethernet Carrier Group Alarm (CGA)." This application may also be related to U.S. patent application Ser. No. 14/531,000 (the "'000 application"), filed Nov. 3, 2014 by Michael K. Bugenhagen, entitled, "Physical to Virtual Network Transport Function Abstraction," which claims benefit of priority to provisional U.S. Patent Application Ser. No. 61/907,330 (the "'330 application"), filed Nov. 21, 2013 by Michael K. Bugenhagen, entitled, "Physical to Virtual Network Transport Function Abstraction."

The respective disclosures of these applications/patents (which this document refers to collectively as the "Related Applications") are incorporated herein by reference in their entirety for all purposes.

COPYRIGHT STATEMENT

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

FIELD

The present disclosure relates, in general, to methods, systems, and computer software for implementing applications management, and, in particular embodiments, to methods, systems, and computer software for implementing applications management, based at least in part on operations, administration, and management ("OAM") information.

BACKGROUND

In typical virtualized computing systems, both application frame flow and operations, administration, and management ("OAM") frame flow are sent to and received by a virtual machine ("VM") running software and/or applications, the VM being hosted on a host computing system. Such a configuration, however, is susceptible to loss of OAM frames. In particular, when the VM or the software and/or applications running on the VM are suspended (for any number of reasons), the OAM frames received by or not yet sent by the VM software application expires, dies, or is otherwise lost.

Further, such VMs typically do not allow for OAM frame generation. Moreover, such typical virtualized computing systems do not allow for hot upgradeable OAM settings. In other words, when the VM changes or swaps addresses, the OAM frames would change, but the VM and/or the host computing system must necessarily be shut down and restarted in order for the changes to take effect, and thus the typical virtualized computing systems are not hot upgradeable.

Hence, there is a need for more robust and scalable OAM solutions and solutions for implementing applications management, based at least in part on OAM information.

BRIEF SUMMARY

Various embodiments provide techniques for implementing applications management, based at least in part on operations, administration, and management ("OAM") information.

In some embodiments, a host computing system might comprise an orchestrator, one or more virtual machines ("VMs") on which software and/or applications are run, and one or more interface devices. The host computing system might further comprise a VM management agent that might serve as a dedicated OAM management agent. In such embodiments, normal application frame flow might be sent or received by the VMs, while OAM frame flow(s) might be sent or received by the VM management agent (which in some cases might be an OAM server).

According to some embodiments, the use of the separate multi-personality, dedicated OAM management agent (embodied by the VM management agent) avoids loss of OAM frames if and when any of the one or more VMs and/or any of the software and/or applications running on the one or more VMs are suspended (for whatever reason), because the VM management agent would continue to run independently of the VMs. In some cases, the VM management agent might also be configured to generate OAM frames, and thus may also serve as an OAM frame generator.

Alternatively, or additionally, the VM management agent might determine whether at least one OAM frame has changed in response to a change in address of a far-end server function, a near-end OAM server function, or both server functions that are associated with a VM of the one or more VMs. Based on a determination that at least one OAM frame has changed (in response to a change in address of one or more such server functions), the VM management agent might update a list associating the at least one OAM frame that has changed with corresponding at least one VM of the one or more VMs, without restarting any of the at least one VM, the VM management agent, and/or the host computing system—thereby allowing for hot upgradeability of OAM settings.

The various embodiments, as described herein and as claimed, amount to significantly more than any abstract idea (that might be present in the claims). In particular, the various embodiments, as described herein and as claimed, effect an improvement to another technology or technical field (in this case, at least the fields of network communications, OAM functionalities, and/or the like), lead to an improvement to the functioning of a computer itself (in this case, to computing devices or systems that form parts of the network, to computing devices or systems for performing OAM functionalities, or the like), and/or move beyond a general link of the use of an abstract idea to a particular technological environment (in this case, moving beyond the concept of application management and/or OAM monitoring to improvements in the fields of network communications, OAM functionalities, and/or the like, and to improvements in the functioning of a computer itself such as the computing devices or systems for performing applications management, for performing functions of a network, for performing OAM functionalities, and/or the like).

The tools provided by various embodiments include, without limitation, methods, systems, and/or software products. Merely by way of example, a method might comprise one or more procedures, any or all of which are executed by a computer system. Correspondingly, an embodiment might provide a computer system configured with instructions to perform one or more procedures in accordance with methods provided by various other embodiments. Similarly, a computer program might comprise a set of instructions that are executable by a computer system (and/or a processor therein) to perform such operations. In many cases, such software programs are encoded on physical, tangible, and/or non-transitory computer readable media (such as, to name but a few examples, optical media, magnetic media, and/or the like).

In an aspect, a method might comprise receiving, with an orchestration agent running on a host computing system, one or more first operations, administration, and management ("OAM") frames and one or more first state information from one or more hardware components. The method might also comprise sending, with the orchestration agent, the one or more first state information to one or more virtualized applications running on one or more virtual machines ("VMs") that are running on the host computing system—in some cases, to the far end via time, length, and value ("TLV") fields of the one or more OAM frames (the TLV fields being used to convey information). The method might further comprise sending, with the orchestration agent, the one or more first OAM frames to one or more VM management agents that are running on the host computing system and that are separate from the one or more VMs, the one or more VM management agents being dedicated OAM management agents.

According to some embodiments, the orchestration agent might be configured to perform an OAM frame mapping function, and sending, with the orchestration agent, the one or more first OAM frames to the one or more VM management agents might comprise sending, with the orchestration agent, the one or more first OAM frames to the one or more VM management agents, using the OAM frame mapping function.

In some embodiments, the one or more first state information might comprise OAM source and destination information, and receiving the one or more first OAM frames and the one or more first state information from the one or more hardware components might comprise receiving, with the orchestration agent, the one or more first OAM frames and the OAM source and destination information from the one or more hardware components along a same channel through one or more interface ports of the host computing system, and passing, with the orchestration agent, the one or more first OAM frames and the OAM source and destination information, along separate, forked channels from the orchestration agent.

In alternative embodiments, the one or more first state information might comprise OAM source and destination information, and receiving the one or more first OAM frames and the one or more first state information from the one or more hardware components might comprise receiving, with the orchestration agent, the one or more first OAM frames and the OAM source and destination information from the one or more hardware components, and passing the one or more first OAM frames and the OAM source and destination information, along separate channels through one or more interface ports of the host computing system.

In some cases, the one or more first OAM frames might comprise at least one of one or more Ethernet OAM frames, one or more Internet protocol/multiprotocol label switching ("IP/MPLS") OAM frames, one or more MPLS OAM frames, and/or one or more two-way active measurement protocol ("TWAMP") OAM frames. In some instances, each of the one or more VM management agents might be configured to perform a multi-layer OAM monitoring function.

According to some embodiments, the one or more first state information might comprise port hardware information comprising one or more of loss of signal ("LOS") notifications, jabber, switch monitoring ("SMON") counters, remote network monitoring ("RMON") counters, vendor-specific implementation of committed information rate ("CIR") and extended information rate ("EIR"), policier or policy information, shaper information, alarm indication signal ("AIS") notifications, carrier group alarm ("CGA") notifications, fragmented frames, flow level statistics, maintenance entity information, functionality information, ping information, trace router information, loopback information, information on test frames, information on connectivity, information on synthetic frames, or label-switched path ("LSP") OAM channel tunnel status information, and/or the like.

In some embodiments, the method might further comprise determining, with a VM management agent of one or more VM management agents, whether at least one first OAM frame of the one or more first OAM frames has changed in response to a change in address of at least one of far-end or near-end OAM server functions associated with a VM of the one or more VMs. The method might also comprise updating, with the VM management agent, a list associating the at least one first OAM frame that has changed with corresponding at least one VM of the one or more VMs, without restarting any of the at least one VM, the VM management agent, the one or more VM management agents, or the host computing system, based on a determination that at least one first OAM frame of the one or more first OAM frames has changed.

According to some embodiments, the method might further comprise generating, with a VM management agent of one or more VM management agents, at least one second OAM frame and at least one second state information, the at least one second state information comprising information associated with at least one of state of the VM management agent, state of the one or more VM management agents, state of network connectivity, or state of at least one VM of the one or more VMs, and/or the like. The method might also comprise sending, with the VM management agent, one or more of the at least one second OAM frame or the at least one second state information to the orchestration agent.

In another aspect, a method might comprise generating, with a virtual machine ("VM") management agent of one or more VM management agents, one or more operations, administration, and management ("OAM") frames and one or more state information. The one or more VM management agents might be running on a host computing system and might be separate from one or more VMs on which one or more virtualized applications are being run. The method might further comprise sending, with the VM management agent, at least one of the one or more OAM frames or the one or more state information to an orchestration agent running on the host computing system.

In some cases, the one or more state information might comprise information associated with at least one of state of the VM management agent, state of the one or more VM management agents, state of network connectivity, or state of at least one VM of the one or more VMs, and/or the like. In some instances, the one or more OAM frames might comprise at least one of one or more Ethernet OAM frames, one or more Internet protocol/multiprotocol label switching ("IP/MPLS") OAM frames, one or more MPLS OAM frames, or one or more two-way active measurement protocol ("TWAMP") OAM frames, and/or the like. According to some embodiments, each of the one or more VM management agents might be configured to perform a multi-layer OAM monitoring function.

In some embodiments, the method might further comprise determining, with the VM management agent, whether at least one OAM frame of the one or more OAM frames has changed in response to a change in address of at least one of far-end or near-end OAM server functions associated with a VM of the one or more VMs. The method might also comprise updating, with the VM management agent, a list associating the at least one OAM frame that has changed with corresponding at least one VM of the one or more VMs, without restarting any of the at least one VM, the VM management agent, the one or more VM management agents, or the host computing system, based on a determination that at least one OAM frame of the one or more OAM frames has changed.

In yet another aspect, a method might comprise determining, with a virtual machine ("VM") management agent of one or more VM management agents, whether one or more operations, administration, and management ("OAM") frames have changed in response to a change in address of at least one of far-end or near-end OAM server functions associated with a VM of the one or more VMs. The one or more VM management agents might be running on a host computing system and might be separate from one or more VMs on which one or more virtualized applications are being run. The method might further comprise updating, with the VM management agent, a list associating the one or more OAM frames that have changed with corresponding at least one VM of the one or more VMs, without restarting any of the at least one VM, the VM management agent, the one or more VM management agents, or the host computing system, based on a determination that one or more OAM frames have changed.

In some cases, the one or more OAM frames might comprise at least one of one or more Ethernet OAM frames, one or more Internet protocol/multiprotocol label switching ("IP/MPLS") OAM frames, one or more MPLS OAM frames, or one or more two-way active measurement protocol ("TWAMP") OAM frames. In some instances, each of the one or more VM management agents might be configured to perform a multi-layer OAM monitoring function.

In still another aspect, a system might comprise a host computing system. The host computing system might comprise one or more processors, one or more hardware components, and a non-transitory computer readable medium having encoded thereon a set of instructions that, when executed by the one or more processors, causes the one or more hardware components to perform one or more operations. The set of instructions might comprise instructions for receiving one or more operations, administration, and management ("OAM") frames and one or more state information from the one or more hardware components, and instructions for sending the one or more state information to one or more virtualized applications running on one or more virtual machines ("VMs") that are running on the host computing system. The set of instructions might further comprise instructions for sending the one or more OAM frames to one or more VM management agents that are running on the host computing system and that are separate from the one or more VMs, the one or more VM management agents being dedicated OAM management agents.

In a further aspect, a system might comprise a host computing system. The host computing system might comprise one or more processors, one or more hardware components, and a non-transitory computer readable medium having encoded thereon a set of instructions that, when executed by the one or more processors, causes the one or more hardware components to perform one or more operations. The set of instructions might comprise instructions for generating one or more operations, administration, and management ("OAM") frames and one or more state information associated with a virtual machine ("VM") management agent that is running on a host computing system and that is separate from one or more VMs on which one or more virtualized applications are being run. The set of instructions might further comprise instructions for sending at least one of the one or more OAM frames or the one or more state information to an orchestration agent running on the host computing system.

In another aspect, a system might comprise a host computing system. The host computing system might comprise one or more processors, one or more hardware components, and a non-transitory computer readable medium having encoded thereon a set of instructions that, when executed by the one or more processors, causes the one or more hardware components to perform one or more operations. The set of instructions might comprise instructions for determining whether one or more operations, administration, and management ("OAM") frames have changed in response to a change in address of at least one of far-end or near-end OAM server functions associated with a virtual machine ("VM") on which one or more virtualized applications are being run, the one or more VMs running on the host computing system. The set of instructions might further comprise instructions for updating a list associating the one or more OAM frames that have changed with corresponding at least one VM, without restarting any of the at least one VM or the host computing system, based on a determination that one or more OAM frames have changed.

Various modifications and additions can be made to the embodiments discussed without departing from the scope of the invention. For example, while the embodiments described above refer to particular features, the scope of this invention also includes embodiments having different combination of features and embodiments that do not include all of the above described features.

BRIEF DESCRIPTION OF THE DRAWINGS

A further understanding of the nature and advantages of particular embodiments may be realized by reference to the remaining portions of the specification and the drawings, in which like reference numerals are used to refer to similar components. In some instances, a sub-label is associated with a reference numeral to denote one of multiple similar components. When reference is made to a reference numeral without specification to an existing sub-label, it is intended to refer to all such multiple similar components.

DETAILED DESCRIPTION OF CERTAIN EMBODIMENTS

Figure 1:
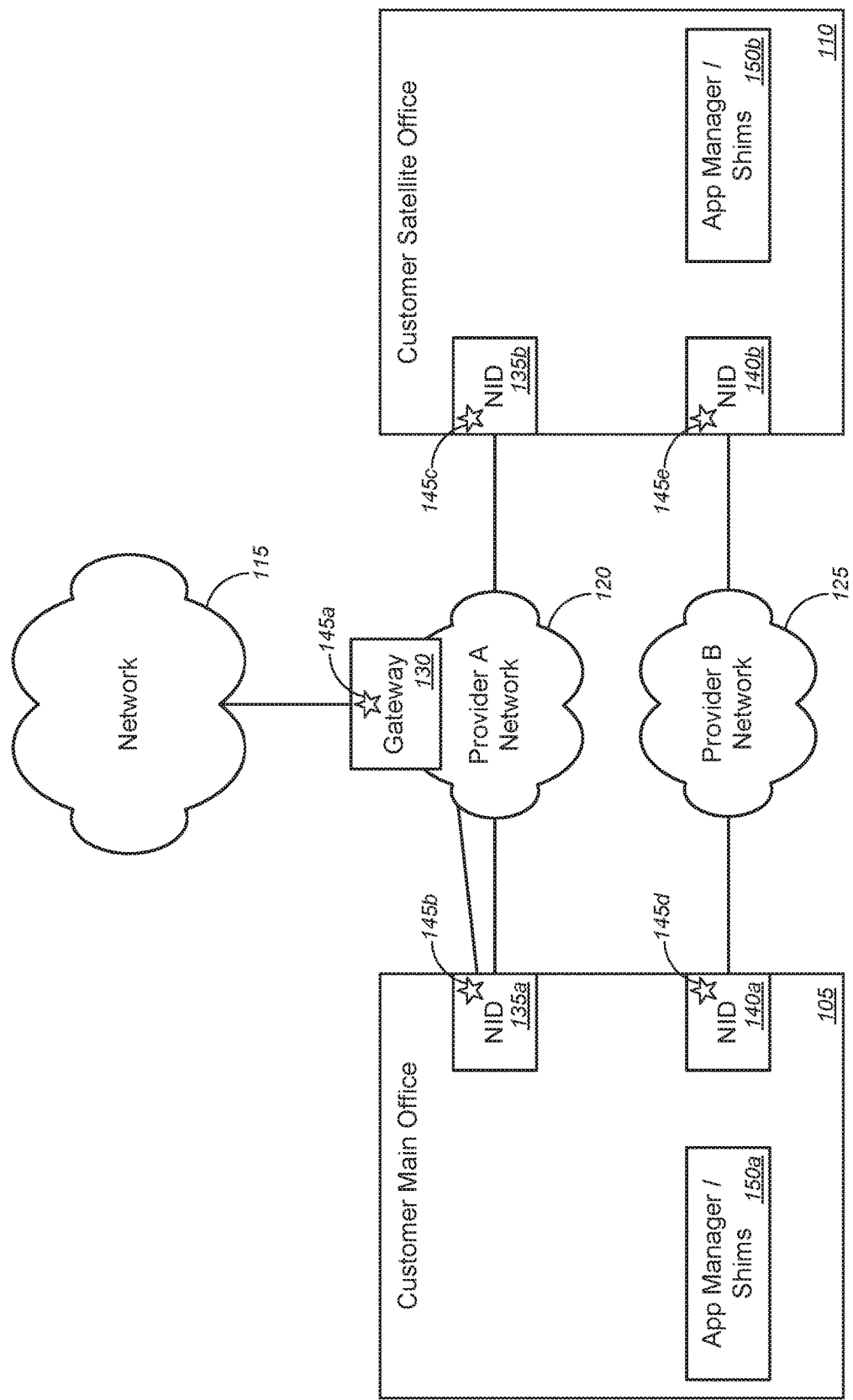
FIG. 1 is a schematic diagram illustrating a system for implementing applications management, based at least in part on operations, administration, and management ("OAM") information monitored by "compute" resources located at network devices, some of which are located at customer premises, in accordance with various embodiments.

While various aspects and features of certain embodiments have been summarized above, the following detailed description illustrates a few exemplary embodiments in further detail to enable one of skill in the art to practice such embodiments. The described examples are provided for illustrative purposes and are not intended to limit the scope of the invention.

In the following description, for the purposes of explanation, numerous specific details are set forth in order to provide a thorough understanding of the described embodiments. It will be apparent to one skilled in the art, however, that other embodiments of the present invention may be practiced without some of these specific details. In other instances, certain structures and devices are shown in block diagram form. Several embodiments are described herein, and while various features are ascribed to different embodiments, it should be appreciated that the features described with respect to one embodiment may be incorporated with other embodiments as well. By the same token, however, no single feature or features of any described embodiment should be considered essential to every embodiment of the invention, as other embodiments of the invention may omit such features.

Unless otherwise indicated, all numbers used herein to express quantities, dimensions, and so forth used should be understood as being modified in all instances by the term "about." In this application, the use of the singular includes the plural unless specifically stated otherwise, and use of the terms "and" and "or" means "and/or" unless otherwise indicated. Moreover, the use of the term "including," as well as other forms, such as "includes" and "included," should be considered non-exclusive. Also, terms such as "element" or "component" encompass both elements and components comprising one unit and elements and components that comprise more than one unit, unless specifically stated otherwise.

Various embodiments provide techniques for implementing applications management, based at least in part on operations, administration, and management ("OAM") information.

In some embodiments, a host computing system might comprise an orchestration agent, one or more virtual machines ("VMs") on which software and/or applications are run, and one or more interface devices. The orchestration agent, in some cases, might include, without limitation, an orchestrator, a hypervisor, an operating system ("OS") of the host computing system (also referred to as "host OS"), a container, an input/output ("I/O") scheduler function, a virtual Ethernet function, a host scheduler, a shim function, and/or the like. The one or more interface devices might include, but are not limited to, one or more physical Ethernet ports, one or more port acceleration hardware, and/or the like that interface with one or more hardware components—which might include, without limitation, one or more storage devices, one or more networks, one or more network components/devices, one or more special function devices, and/or or the like.

The host computing system might further comprise a VM management agent that might serve as a dedicated OAM management agent. In such embodiments, normal application frame flow might be sent or received by the VMs, while OAM frame flow might be sent or received by the VM management agent (which in some cases might be an OAM server). In some embodiments, the orchestration agent might utilize OAM frame mapping function to forward OAM frames to and from the VM management agent. According to some embodiments, the use of the separate, dedicated OAM management agent (embodied by the VM management agent) avoids loss of OAM frames if and when any of the one or more VMs and/or any of the software and/or applications running on the one or more VMs are suspended (for whatever reason), because the VM management agent would continue to run independently of the VMs. In some cases, the VM management agent might also be configured to generate OAM frames, and thus may also serve as an OAM frame generator.

Alternatively, or additionally, the VM management agent might determine whether at least one OAM frame has changed in response to a change in address of a far-end server function, a near-end OAM server function, or both server functions, which are associated with a VM of the one or more VMs. Based on a determination that at least one OAM frame has changed (in response to a change in address of one or more such server functions), the VM management agent might update a list associating the at least one OAM frame that has changed with corresponding at least one VM of the one or more VMs, without restarting any of the at least one VM, the VM management agent, and/or the host computing system—thereby allowing for hot upgradeability of OAM settings.

Herein, a "hypervisor" might refer to a virtual machine manager ("VMM"), which might be a component of computer software, firmware, and/or hardware that creates and runs virtual machines. The "hypervisor" might run one or more VMs on a computer defined as a "host machine," and each of the one or more VMs might be defined as a "guest machine." In operation, the "hypervisor" might provide the "guest machines" or operating systems of the "guest machines" with a virtual operating platform, and might manage the execution of the "guest machine" operating systems.

A "container" might refer to a virtual construct that is similar to a virtual machine, except that, in some embodiments, containers (within a host computing system) share the same operating system, and thus do not need to run multiple instances of the operating system (as in the case of VMs in a host computing system). Accordingly, containers may be smaller in size and may be more efficient to run compared with VMs or hypervisors.

The term "business support system" ("BSS") might refer to components that a service provider (such as a telephone operator or telecommunications company) might use to run its business operations, including, for example, taking orders, handling payment issues, or dealing with revenues, and the like. BSS might generally cover the four main areas of product management, customer management, revenue management, and order management. In a related manner, the term "operations support system" ("OSS") might refer to components used by telecommunications service providers to deal with the telecommunications network itself, supporting processes including, but not limited to, maintaining network inventory, provisioning services, configuring network components, managing faults, and the like. The two systems functioning together might be referred to as "BSS/OSS."

An "advanced intelligent network" ("AIN") might refer to any telephone network that queries a database before a telephone call is sent to its final destination in order to determine how to handle or route the call. A typical AIN might provide the following two main functionalities: (1) the AIN might be able to affect or change the routing of calls within it from moment to moment, based on some criteria; and (2) the AIN might allow the originator or the ultimate receiver of the call to somehow inject intelligence into the network to affect the flow of the outbound or inbound call. Typically, AINs might comprise signal control points ("SCPs"), signal switching points ("SSPs"), and signal transfer points ("STPs"), all of which might communicate via out-of-band signaling, using, for example, signaling system 7 ("SS7") protocol. SCPs are typically computers that hold databases in which customer-specific information used by the network for routing calls might be stored. SSPs are typically digital telephone switches that communicate with SCPs to request for customer-specific instructions pertaining to call completion. STPs are typically packet switches that shuttle messages between SSPs and SCPs.

An "application programming interface" ("API") might refer to a protocol intended to be used as an interface by software components to communicate with each other.

Figure 2:
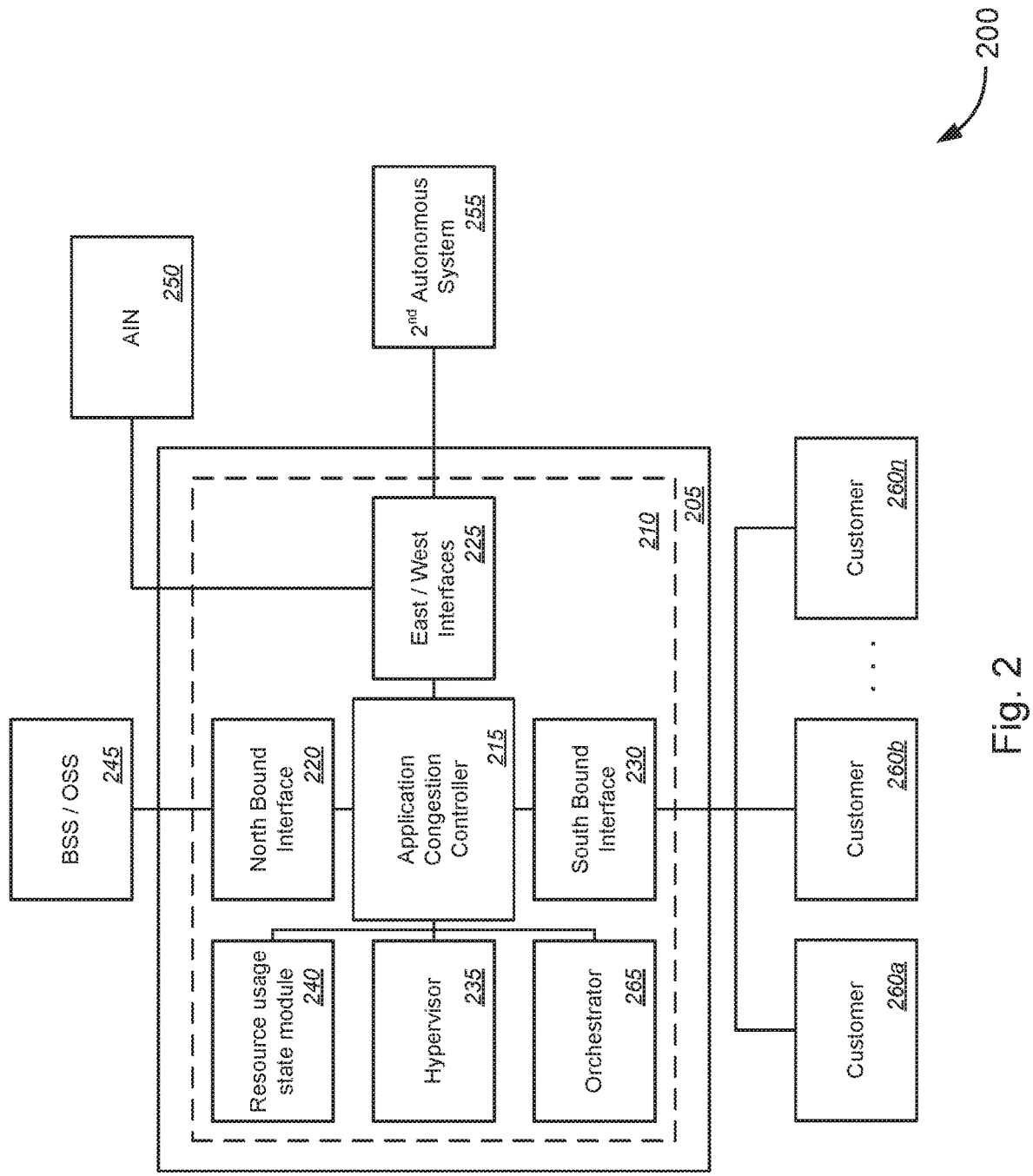
FIG. 2 is a block diagram illustrating a system for controlling virtualization congestion and for implementing applications management, based at least in part on OAM information, in accordance with various embodiments.

"Virtualization" might refer to a process of mapping hardware resources to create "virtual machine resource" within the framework of the VMs so that the VM environment may utilize the hardware resources. For example, each of the north, south, east, and west interfaces shown in FIG. 2 are parts of physical and/or virtual links that have been apportioned or "virtualized" to an application as a port to the application, which might be associated with various external components (i.e., BSS/OSS, AIN, second autonomous systems, customers, and the like) via the hardware or host system on which the VM is running. FIG. 2 refers to a virtualization congestion control frameworks as described in detail in the '000, '147, and '450 applications (already incorporated herein), one or more infrastructure components of which may, in some non-limiting embodiment, be utilized in implementing physical to virtual network transport function abstraction, as discussed in the '000 application.

We now turn to the embodiments as illustrated by the drawings. FIGS. 1-12 illustrate some of the features of the method, system, and apparatus for implementing operations, administration, and management ("OAM") information monitoring, OAM frame generation, and/or hot upgradeability of OAM settings, and for implementing applications management, based at least in part on OAM information monitoring, as referred to above. The methods, systems, and apparatuses illustrated by FIGS. 1-12 refer to examples of different embodiments that include various components and steps, which can be considered alternatives or which can be used in conjunction with one another in the various embodiments. The description of the illustrated methods, systems, and apparatuses shown in FIGS. 1-12 is provided for purposes of illustration and should not be considered to limit the scope of the different embodiments.

FIG. 1 is a schematic diagram illustrating a system 100 for implementing applications management, based at least in part on operations, administration, and management ("OAM") information monitored by "compute" resources located at network devices, some of which are located at customer premises, in accordance with various embodiments. In the embodiment of FIG. 1, system 100 might comprise a customer main office 105, a customer satellite office 110, a network 115, provider A network 120, provider B network 125, a gateway or gateway device 130, a first network interface device ("NID") 135 at each office (i.e., NID 135a at main office 105 and NID 135b at satellite office 110), and a second NID 140 at each office (i.e., NID 140a at main office 105 and NID 140b at satellite office 110).

Herein, "provider" might refer to a service provider, which might include, without limitation, a network service provider, or any other suitable service provider, or the like. Merely by way of example, each network (e.g., network 115, network 120, or network 125) can include a local area network ("LAN"), including without limitation a fiber network, an Ethernet network, a Token-Ring™ network and/or the like; a wide-area network ("WAN"); a wireless wide area network ("WWAN"); a virtual network, such as a virtual private network ("VPN"); the Internet; an intranet; an extranet; a public switched telephone network ("PSTN"); an infra-red network; a wireless network, including without limitation a network operating under any of the IEEE 802.11 suite of protocols, the Bluetooth™ protocol known in the art, and/or any other wireless protocol; and/or any combination of these and/or other networks. In a particular embodiment, the network might include an access network of the service provider (e.g., an Internet service provider ("ISP")). In another embodiment, the network might include a core network of the service provider, and/or the Internet.

As shown in FIG. 1, high reliability businesses often choose to use redundant connectivity services to ensure minimal, if not zero down time. Service providers—including, but not limited to, financial traders, airport businesses, airport facilities, first responders, and/or the like—all tend to use these types of redundant connectivity schema. Services and functionalities—including, without limitation, Internet of Things (i.e., machine to machine connectivity), wireless backhaul, and/or the like—also tend to utilize such redundant connectivity schema. An issue with such redundant connectivity schema is that such schema does not provide the customer systems with any combined intelligence information on the performance of all the systems (especially as some network components might be maintained or operated by one provider, while other network components might be maintained or operated by a different provider). Accordingly, handling faults in one or more connections can still impact the customer's user applications or the like.

One solution is the use of network functions virtualization ("NFV"), which adds the ability to place "compute" resources (such as compute resource 145, denoted by a "star" symbol) on network devices such as the NID (e.g., NIDs 135 and 140), the gateway (e.g., gateway 130), and/or the like, where the user connects to the network(s) (e.g., networks 115-125, or the like). This solution allows adding of a "customer application" to provide multi-provider connectivity and performance information for the customers and their applications. In some embodiments, the "star" symbol also denotes customer application deployment locations, which may be located at the "compute" resources 145.

According to some embodiments, providers (e.g., provider A or provider B, or the like) might use a NFV schema (as described herein) that enables a customer to deploy applications either provided by the provider, the customer, and/or a third party. In some cases, the provider might provide NIDs and/or gateways that allow the deployment of such applications or resources (e.g., network and/or hardware resources) for implementing such applications, or the like. In some instances, the provider might either manage the service(s) for the customer (e.g., in a managed switched virtual circuit ("SVC") scenario or the like) or enable the customer to deploy the applications and to manage the applications fully on its own. In various embodiments, the application might be "aware" of the other applications—that is, there might be a customer application that manages applications deployed in the network.

In some embodiments, the system 100 might further comprise one or more manager applications, which are applications that manage the compute resources 145. The one or more manager applications might be provided either via a provider graphical user interface ("GUI")—including, but not limited to, a web interface, another type of interface, and/or other means—or via an application deployed at the customer locations as a standalone GUI tool, and possibly as part of the customer's router control plane stack, VM Ware or other orchestration stack, and/or other communication systems controller(s), or the like. In one set of embodiments, the one or more manager applications may be provided via application manager and/or shims 150 (which includes application manager and/or shims 150a at the customer main office 105 and application manager and/or shims 150b at the customer satellite office 110), or the like. Here, a "shim" might refer to a small library that performs one or more of the following: transparently intercepts application programming interface ("API") calls, changes arguments passed through it, handles operations themselves, and/or redirects operations to other components. Shims are typically used when behavior of APIs change (or are likely to change), and can also be used for running programs on software platforms that are different from the software platforms for which the programs were originally developed.

In operation, in some aspects, operations, administration, and management ("OAM") information, OAM frames, or OAM frame flows might be sent or received over OAM channels between each NID (i.e., NIDs 135 and 140, or the like) and each network (e.g., networks 120 and 125, or the like), and between each gateway (e.g., gateway 130) and each network (e.g., networks 115-125, or the like). The application (or application manager) might monitor and/or signal the OAM information, frames, and/or frame flows, and the OAM information, frames, and/or frame flows might provide "metrics and signals" on the applications.

In some cases, the application manager 150 might act as a controller of the applications to provide a single view of the network connectivity so that it can signal when a path is degraded, and even which path is the best choice if both are degraded. The application manager 150 (as the controller of the applications) might encompass all the operational scenarios and might act as the transport connection manager for all systems using the wide area network ("WAN").

According to some embodiments, when a client computer has Internet protocol security ("IPsec") running and/or wants to detect and determine utilization rates, the application may provide such information as well. In such a case, multi-layer OAM monitoring function can be implemented in the probe that can be managed as a single connection entity in the application manager and/or shims 150 for routing transport protocols. Herein, "multi-layer OAM monitoring function" might refer to simultaneous monitoring of multiple layers (e.g., simultaneous monitoring of layer 2 and layer 3, simultaneous monitoring of two or more such layers, and/or the like) and/or simultaneous monitoring of any combination of Ethernet OAM information, IP OAM information, Internet protocol/multiprotocol label switching ("IP/MPLS") OAM information, MPLS OAM information, two-way active measurement protocol ("TWAMP") OAM information, IPsec information, virtual private network information, application layer information, and/or the like. Because multiple types of OAM and other information may be monitored (in some cases simultaneously), the OAM servers, the compute resources 145, and/or the application manager 150 might be referred to as being "multi-lingual." In some cases, each of the compute resources 145 might comprise an OAM server. In some instances, the OAM server might include a multi-layer personality OAM server function. Here, "personality" in "multi-layer personality OAM server function" might refer to the OAM server function that monitors addresses, or monitors frames, and/or the like. In a similar manner as above, "multi-personality" might refer to simultaneous monitoring of addresses and frames, and/or other characteristics or types of information.

Transport protocols, in some cases, might include, without limitation, open shortest path first ("OSPF") protocol, intermediate system to intermediate system ("IS-IS") protocol, IP/MPLS protocol, and/or any other suitable customer transport protocol, or the like. OSPF protocol might be a type of routing protocol, and is most widely used as an interior gateway protocol in large enterprise networks or the like. IS-IS protocol might also be a type of routing protocol, and is designed to move information efficiently within a computer network, a group of physically connected computing systems, and/or similar devices, or the like.

The OAM functionalities referred to above are described in greater detail below with respect to FIGS. 7-11.

As discussed above, FIG. 2 is a block diagram illustrating a system 200 for controlling virtualization congestion and for implementing applications management, based at least in part on OAM information, as described in detail in the '000, '147, and '450 applications (already incorporated herein).

In the embodiment of FIG. 2, system 200 might comprise computer or hardware system 205. Computer or hardware system 205, in some embodiments, might serve as a host machine or host system that creates and/or operates a virtual environment (or virtual machine environment) 210, in which an application congestion controller 215 (also referred to herein as an "application controller" or a "congestion engine") might run. The application congestion controller 215 might be operatively coupled to a number of interfaces or components, including, but not limited to, a north or north bound interface 220, east/west or east/west bound interfaces 225, south or south bound interface 230, a hypervisor 235, a resource usage state module 240, and an orchestrator 265, some or all of which might be executed within the virtual environment 210.

System 200 might further comprise a BSS/OSS 245, an AIN 250, one or more second autonomous systems 255, and one or more customers 260. In some embodiments, second autonomous systems 255 might include a computer or hardware system that might be similar to, identical to, or different from computer or hardware system 205. The one or more customers 260 might include customers 260a, 260b, through 260n. Each of customers 260a, 260b, through 260n might comprise a customer device including, but not limited to, POTS telephones, voice over Internet protocol ("VoIP") telephones, cellular telephones, smart phones, tablet computers, laptop computers, desktop computers, or the like.

Computer or hardware system 205 and the second autonomous systems 255 might be located in another service provider network, or might be physically different systems not inside the VM environment but still in the service provider facilities or premises, and might be associated with one or more of VoIP switches, Internet protocol television ("IPTV") servers, content delivery network ("CDN") servers, Internet servers, other network servers, and the like. In some cases, the computer or hardware system 205 and/or the second autonomous systems 255 might comprise one or more of VoIP servers or switches, IPTV servers, content servers (in a CDN), Internet servers, SS7 nodes, and/or other AIN elements, other network servers, and the like (each of which could be running as an application on a VM within the virtual environment 210). In a particular aspect, such servers can be implemented as applications within a VM or multiple separate VMs on the hardware system 205 and/or the second autonomous systems 255.

As an example, a first customer (e.g., customer 260a) might communicate with a second customer (e.g., customer 260b) via telephone through AIN 250 via a first application (e.g., a VoIP server or switch) running on a first VM within the virtual environment 210 running on the computer or hardware system 205, via the south bound interface 230 and the east/west interface 225. Meanwhile, a third customer (e.g., customer 260n) might be streaming a high-definition ("HD") movie via an IPTV server associated with one of the one or more second autonomous systems 255 via a second application running on a second VM within the virtual environment 210, via the south bound interface 230 and the east/west interface 225. At the same time, the BSS/OSS 245 might be providing business and/or operational support to one or more customers and customer connections via a third application running on a third VM within the virtual environment 210, via the north bound interface 220 and the south bound interface 230. In some aspects, the first, second, and third VMs might be the same VM, or any two of the first, second, or third VMs might be the same VM. In other aspects, the first, second, and third VMs are separate VMs.

Unlike a conventional hypervisor, the orchestrator 265 might coordinate with the resource usage state module 240 (i.e., by communicating with it) to identify the maximum hardware resources of the host system 205, as well as the currently used hardware resources and the currently available resources. Based on such identifications or determinations, the orchestrator 265 might regulate, rather than simply allocate, hardware resources (e.g., CPU memory storage resources, and the like) that might be used by the applications running on the one or more VMs in the virtual environment 210. In other words, the orchestrator 265 might establish bounds for resources allocated to each application based on these determinations, and perhaps based on priority or importance of each application. For example, government and/or emergency service applications (including, but not limited to, Government Emergency Telecommunications Service ("GETS"), or the like) might be given top priority and provided with all the available hardware resources in lieu of other lower priority applications. In some cases, the orchestrator 265 might push back on the excessive hardware resource usage by the one or more applications. According to some embodiments, the orchestrator 265 might provide the one or more applications with a mechanism for controlling push back (see, for example, the buffer utilization feedback discussed in the '000, '147, and '450 applications). System 200 (or at least one or more infrastructure elements of these systems) may, in some embodiments, be utilized in implementing physical to virtual network transport function abstraction, as described in detail with respect to FIG. 4 below or FIGS. 4-6 of the '000 application.

Figure 3:
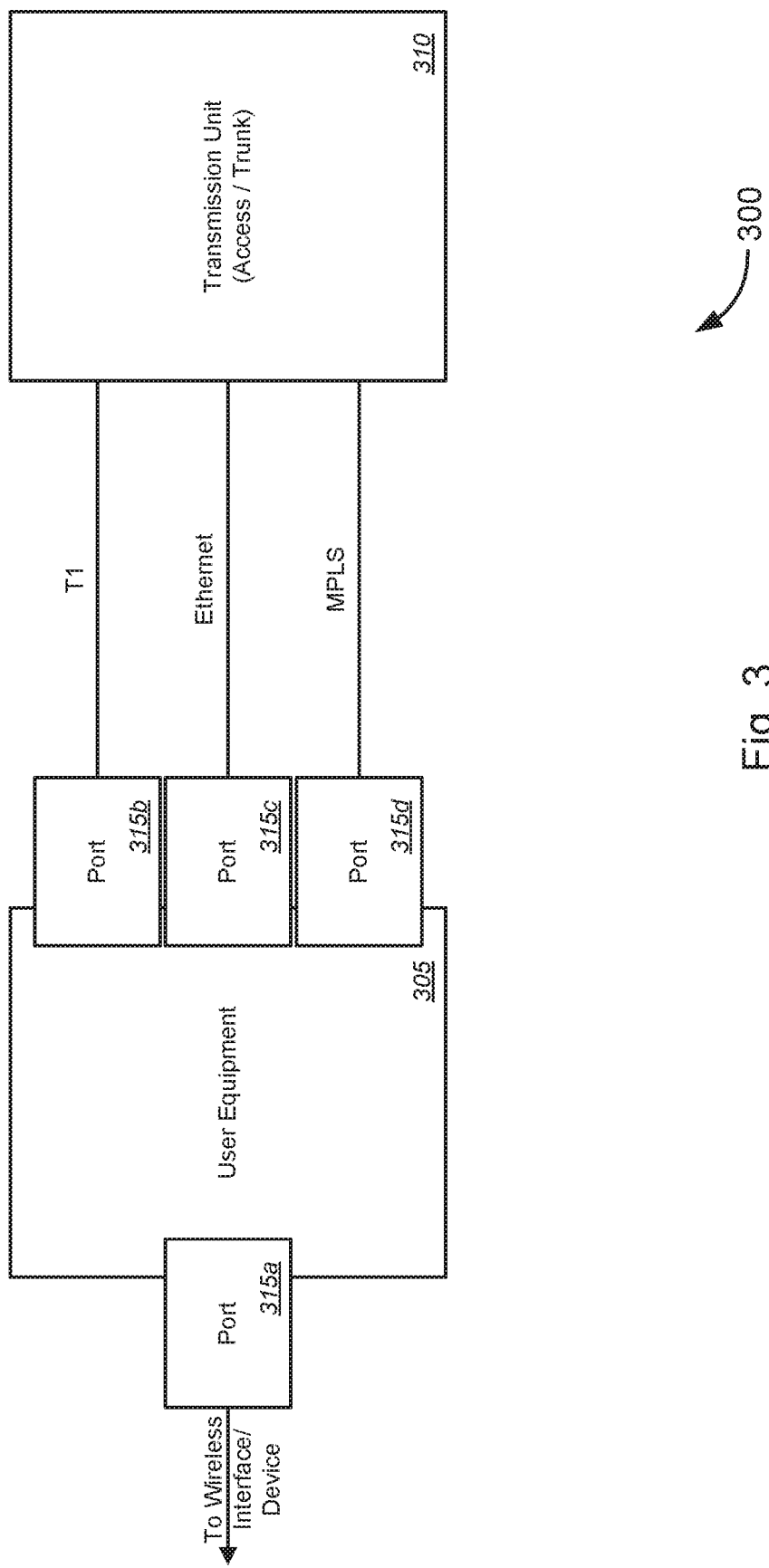
FIG. 3 is a schematic diagram illustrating a system utilizing physical ports for a physical device on which applications are run, in accordance with various embodiments.

FIG. 3 is a schematic diagram illustrating a system 300 utilizing physical ports for a physical device on which applications are run, in accordance with various embodiments. As shown in FIG. 3, system 300 comprises a user equipment, which might include, but is not limited to any suitable end equipment, port bay on switch, application processor/server, and/or user device. The user device might include, without limitation, a laptop computer, a desktop computer, a tablet computer, a smart phone, a mobile phone, and/or the like. System 300 might further comprise a transmission unit 310, which might have access to a network (including, without limitation, an Internet service provider ("ISP") network, data network, a local area network ("LAN"), a wide area network ("WAN"), and/or other suitable network). In some cases, the transmission unit 310 might have access to a trunk of the network.

System 300 might further comprise a plurality of physical ports 315, including ports 315a-315d. In some embodiments, port 315a might provide communication between the user equipment 305 and a wireless device and/or an interface device (not shown). In some cases, port 315a might provide information to one or more software applications running on the user equipment 305 indicating port availability. In some instances, each of ports 315a-315d might provide information indicating port availability. Also universal to all ports are indications regarding port states, such as powered up, powered down, suspend, wake on LAN, wake on WAN, Internet protocol ("IP") stack availability, and/or the like. Access side special functions might include presence awareness. In some cases, the access side special functions might include information regarding whether an address resolution protocol ("ARP") table(s) is(are) registered, whether a media access control ("MAC") address table(s) is(are) registered, whether a machine to machine ("M2M") state engine(s) is(are) registered, and/or the like.

Port 315b might provide a Ti line to the transmission unit 310. In some cases, the Ti line might provide multiple indication signals to one or more software applications running on the user equipment 305. The indication signals might include state information (e.g., connection state information, state change information, virtual driver information, and/or the like) required by at least one of the one or more software applications for continued execution on the user equipment 305. The indication signals might include, without limitation, alarm indication signal ("AIS"), loss of signal ("LOS") notification, carrier group alarm ("CGA") signals, and/or the like. The CGA signals might include yellow, red, and/or blue signals, which are described in detail in the '085 application (which has already been incorporated herein by reference in its entirety). In some embodiments, the yellow (or first) signal (or alarm) might indicate, as a status of the network connection, a receive path error from the network perspective of the one or more customer equipment. The red (or second) signal (or alarm) might indicate, as a status of the network connection, a transmit path error from the network perspective of the one or more customer equipment. The blue (or third) signal (or alarm) might indicate, as a status of the network connection, a performance issue error.

Port 315c might provide an Ethernet line to the transmission unit 310. In some instances, the Ethernet line might provide port indications and/or operations, administration and maintenance/management ("OA&M" or "OAM") level indicators. OAM includes the processes, activities, tools, and/or standards involved with operating, administering, managing, and/or maintaining any system. In a particular example, Ethernet operations, administration, and maintenance ("EOAM") is the protocol for installing, monitoring, and/or troubleshooting Ethernet metropolitan area network ("MANs") and Ethernet wide area network ("WANs"). Establishing end-to-end OAM is a key part of delivering high-performance, carrier-grade Ethernet services. In some embodiments, for a single port, the port indicators and/or OAM level indicators might include, without limitation, LOS, jabber, fragmented frames, and/or various counters (including, without limitation, switch monitoring ("SMON") counters and remote network monitoring ("RMON") counters). SMON is described in detail in RFC 2613 (which is incorporated herein by reference in its entirety for all purposes), while RMON (in its various forms) are described in detail in RFC 2819, RFC 4502, RFC 3273, and RFC 3577, all of which are also incorporated herein by reference in their entirety for all purposes. In some cases, the port indicators and/or OAM level indicators might include, flow level statistics (e.g., policy statistics, shaper statistics, etc.), which might include, but are not limited to, statistics related to one or more of utilization, discarded frames, and/or capacity, or the like. The OAM level indicators might, in some cases, include, without limitation, maintenance entity information, functionality information, ping information, trace router information, loopback information, information on test frames, information on connectivity, information on synthetic frames, and/or the like.

Port 315d might provide a multiprotocol label switching ("MPLS") interface to the transmission unit 310. The MPLS interface might provide information to port 315d, including MPLS OAM indicators. In some embodiments, MPLS OAM indicators might include label-switched path ("LSP") tunnel status information or LSP OAM channel tunnel status information. In some cases, the MPLS OAM indicators might include, flow level statistics (e.g., policy statistics, shaper statistics, etc.), which might include, but are not limited to, statistics related to utilization, discarded frames, and/or capacity, or the like. The MPLS OAM indicators might, in some cases, include, without limitation, maintenance entity information, functionality information, ping information, trace router information, loopback information, information on test frames, information on connectivity, information on synthetic frames, and/or the like.

Figure 4:
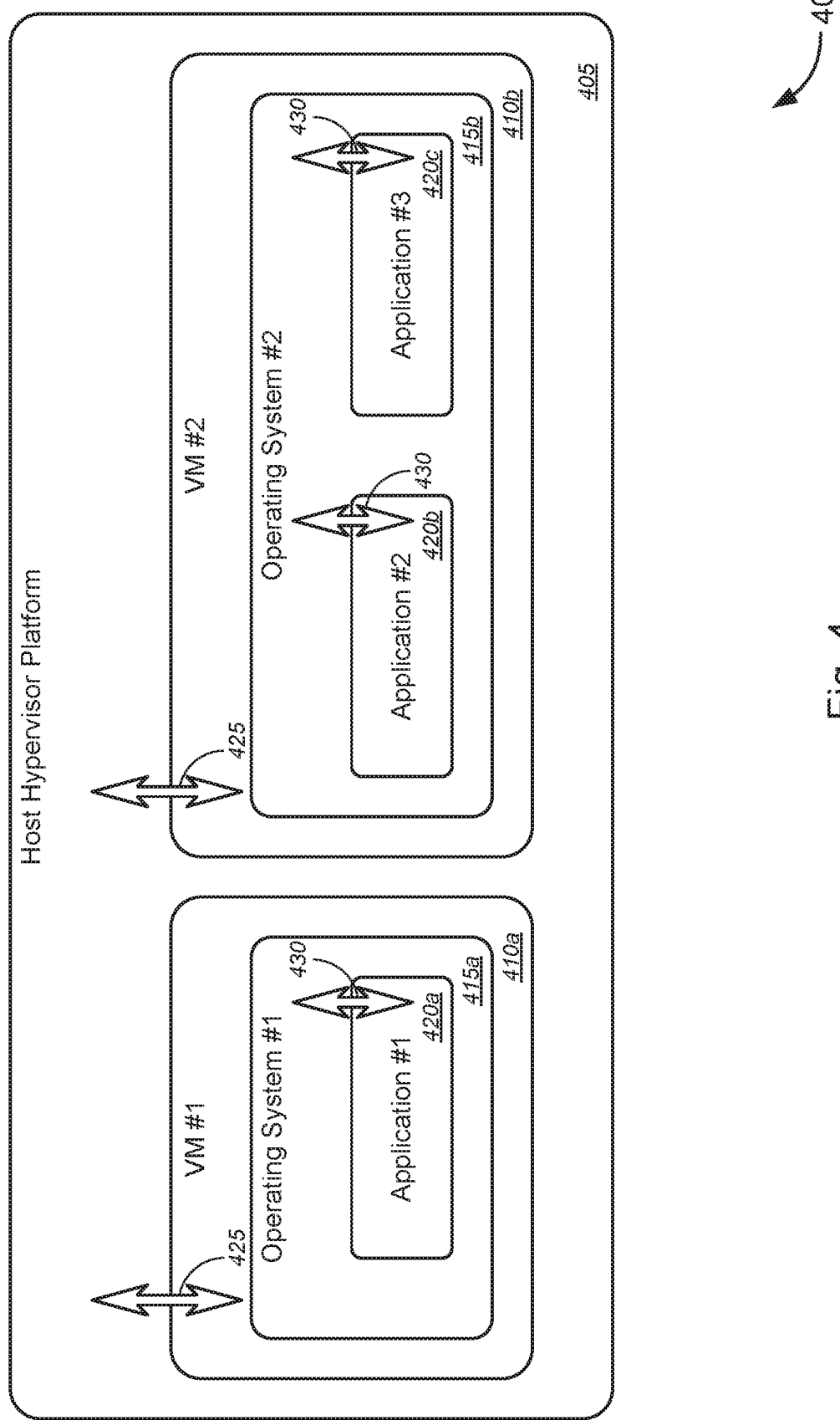
FIG. 4 is a general schematic diagram illustrating a system for implementing physical to virtual network transport function abstraction, in accordance with various embodiments.

When the physical network is transitioned into a virtual network, functionality provided by the physical ports 315a-315d are no longer available in the VM environments. In fact, a key feature of the virtual environment is to hide (or make transparent) the features, characteristics, and communications with physical components. In this manner, the VM manager is provided with flexibility in changing hardware resources as necessary (e.g., for efficient processing, for scalability, etc.) without information the software applications being run, executed, hosted, or otherwise operating in the VM. FIG. 4 below and FIGS. 4-6 (and in some embodiments, FIGS. 1 and 2) of the '000 application illustrate systems in which physical to virtual network transport function abstraction may be implemented to provide the software applications running in the VM with state information (or similar information) necessary for the software applications to continue running, without the physical ports that would provide such information in a physical system.

In FIG. 4, a general schematic diagram is shown illustrating a system 400 for implementing physical to virtual network transport function abstraction, in accordance with various embodiments. System 400 might comprise a host hypervisor platform 405 on which one or more virtual machine ("VM") environments 410 might operate. VM 410 might comprise a first VM 410a and a second VM 410b, or the like. Running on each VM 410 might be one or more operating systems 415. For example, a first operating system 415a might run on the first VM 410a, while a second operating system 415b might run on the second VM 410b. Each of the operating systems 415 might have running thereon one or more software applications 420.

In the non-limiting example of FIG. 4, a first application 420a might run on the first operating system 415a, while a second application 420b and a third application 420c might each be running on the second operating system 415b. The hypervisor 405 might modify allocation of the application resources (including, but not limited to, memory and/or processor resources, etc.) between the hypervisor 405 and each VM 410, as shown by arrow(s) 425. Alternatively, or in addition, the hypervisor 405 might modify allocation of the application resources (including, but not limited to, memory and/or processor resources, etc.) between each operating system 415 and each software application 420, as shown by arrow(s) 430.

In some cases, the host hypervisor platform 405 or an operating system 415 running within one of the VMs 410 might monitor application resource utilization of the host computer system, and the hypervisor 405 might modify allocation of application resources (e.g., as shown by one or both of arrows 425 and 430), based on a determination that application resource utilization has changed. According to some embodiments, the hypervisor 405 might modify allocation of application resources by increasing allocation of application resources to a first set of the one or more software applications, by decreasing allocation of application resources to a second set of the one or more software applications, or both. Such allocation of resources might, in some instances, be based on a determination that application resource utilization is approaching maximum resource use.

According to some embodiments, the hypervisor might provide information to the software applications 420. The information, in some cases, might include state information, including, without limitation, any, some, or all of the state information provided by any, some, or all of the information provided by physical ports 315*a*-315*d*, as discussed above with respect to FIG. 3. In some cases, state information might include connection state information.

Figure 5:
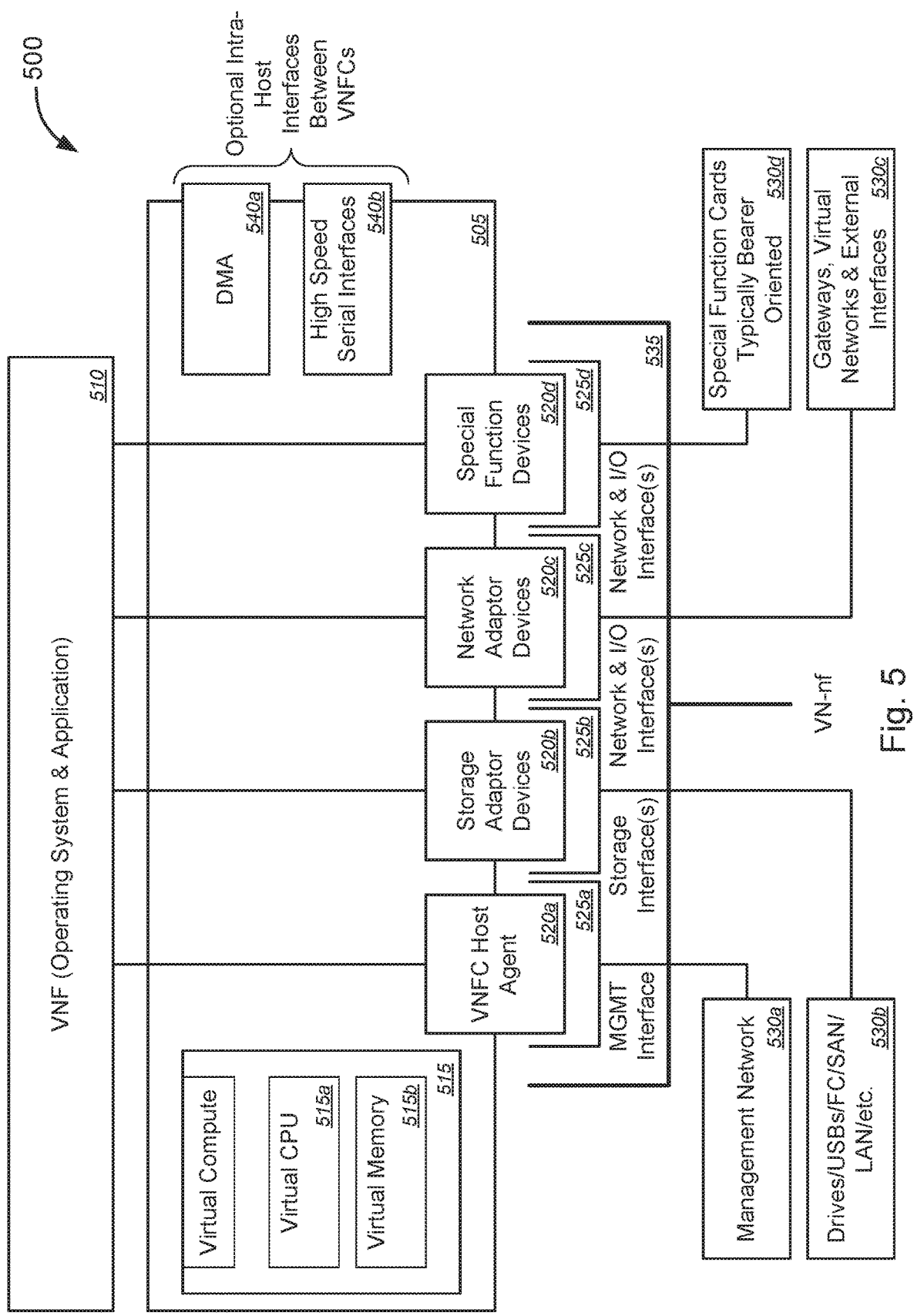
FIG. 5 is a schematic diagram illustrating another system for implementing applications management, based at least in part on OAM information, in accordance with various embodiments.
Figure 6:
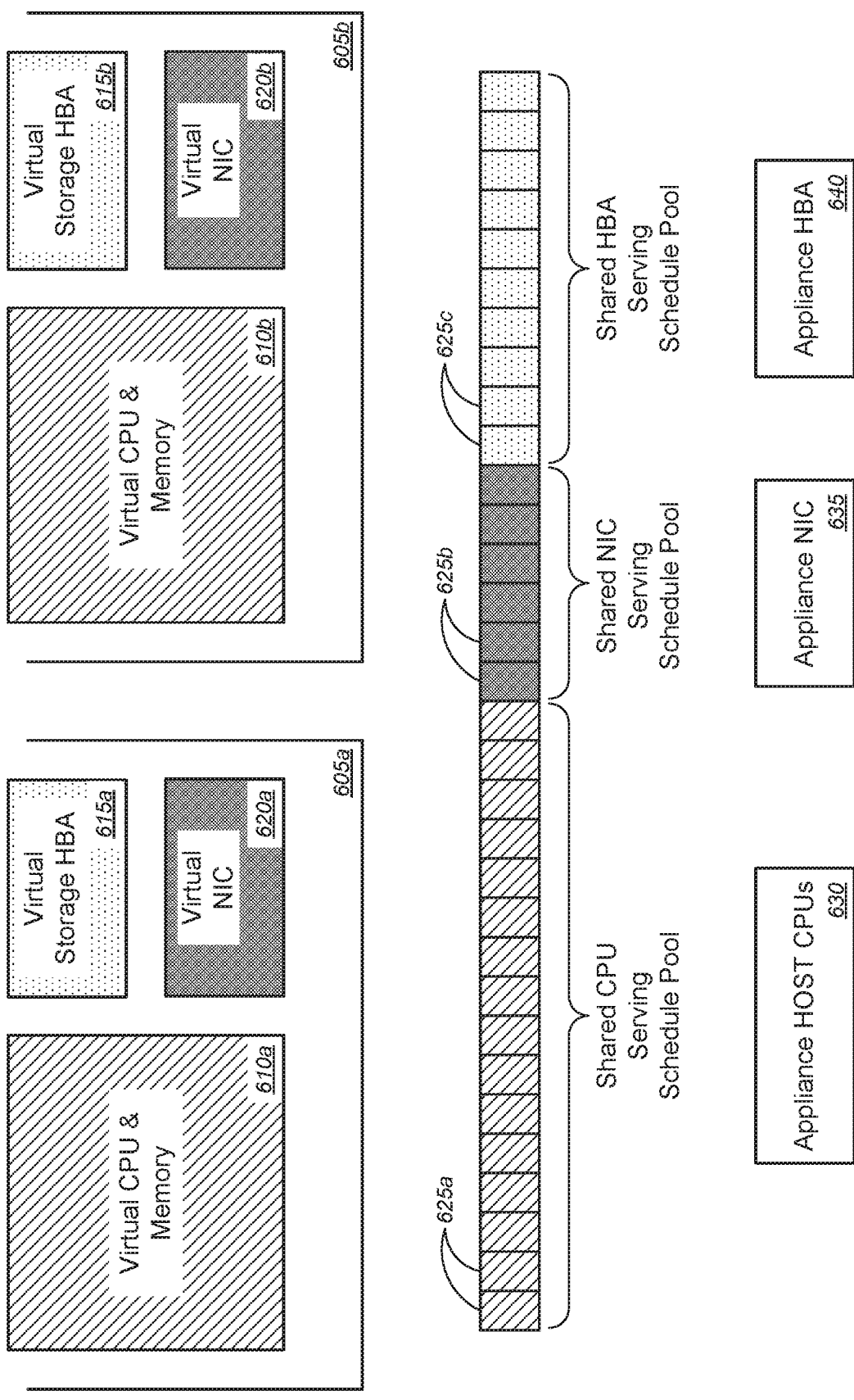
FIG. 6 is a schematic diagram illustrating a method for scheduling and load sharing amongst two or more different virtual network function components/containers ("VNFCs"), in accordance with various embodiments.
Figure 7:
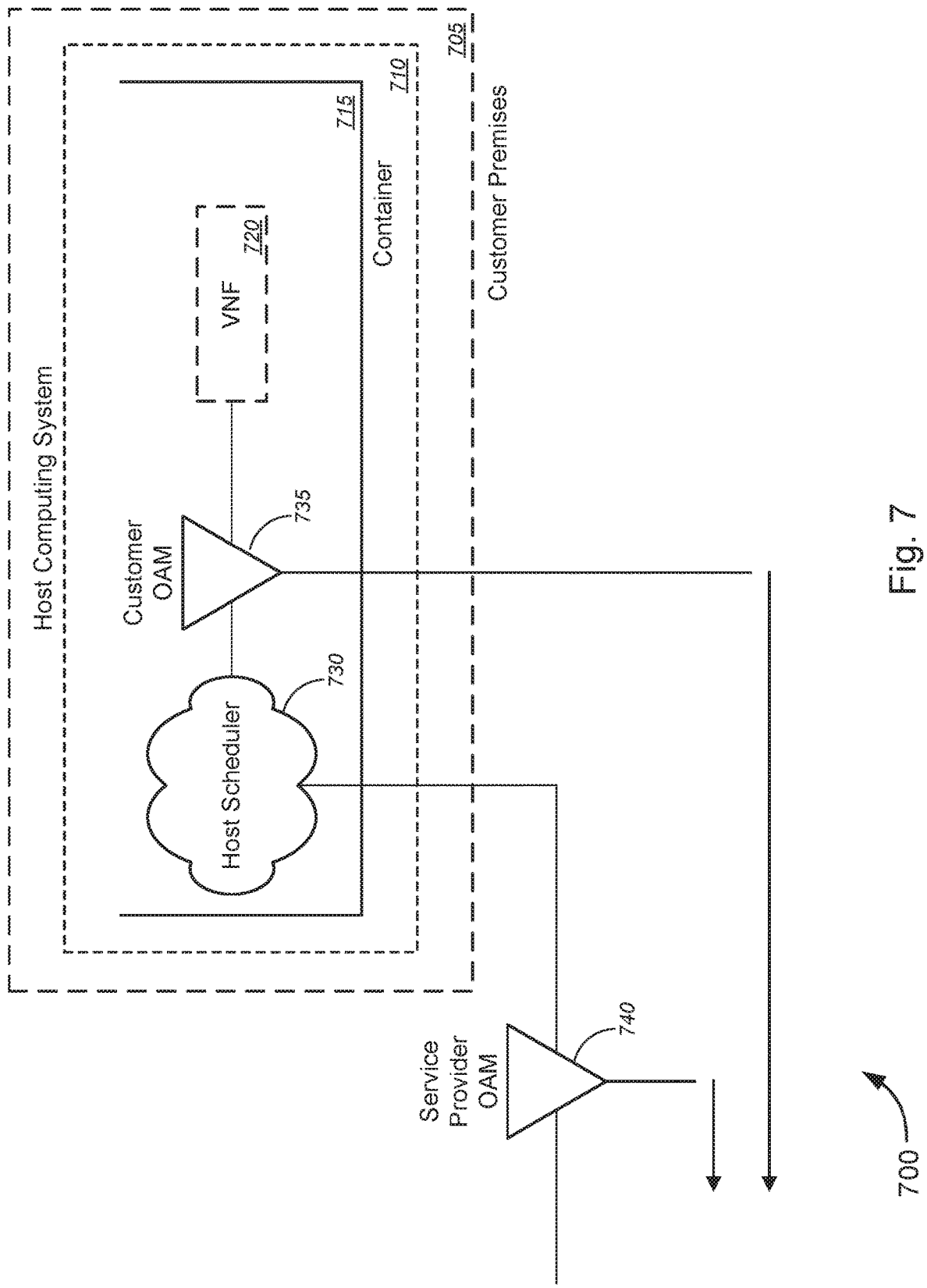
FIG. 7 is a schematic diagram illustrating placement of OAM server functions within a network, in accordance with various embodiments.

We now turn to FIGS. 5-7. FIG. 5 is a schematic diagram illustrating another system 500 for implementing applications management, based at least in part on OAM information, in accordance with various embodiments. FIG. 6 is a schematic diagram illustrating a method 600 for scheduling and load sharing amongst two or more different virtual network function components/containers ("VNFCs"), in accordance with various embodiments. FIG. 7 is a schematic diagram illustrating placement of OAM server functions within a network, in accordance with various embodiments.

In the embodiment of FIG. 5, system 500 might comprise a host computing system 505, one or more virtual network functions ("VNFs") 510 running on the host computing system 505, a virtual compute component 515, one or more devices 520, one or more containers 525 each associated with a corresponding one of the one or more devices 520, one or more hardware components 530, a main container 535, and one or more optional intra-host interfaces between virtual network function components/containers ("VNFCs"), and/or the like.

In some instances, each VNF of the one or more VNFs 510 might include, without limitation, an operating system ("OS"), software, and/or an application, or the like. The virtual computer component 515 might include, but is not limited to, a virtual central processing unit 515*a* ("CPU" or simply "processor") and a virtual memory 515*b*. In some embodiments, the one or more devices 520 might include, without limitation, a VNFC host agent 520*a*, one or more storage adaptor devices 520*b*, one or more network adaptor devices 520*c*, one or more special function devices 520*d*, and/or the like. Each of the VNFC host agent 520*a*, the one or more storage adaptor devices 520*b*, the one or more network adaptor devices 520*c*, the one or more special function devices 520*d*, and/or the like, might be communicatively coupled to each VNF 510. In some cases, each interconnection between VNFC host agent 520*a* and each VNF 510 might include an OS kernel/Hypervisor interface (e.g., drivers, balloon drivers, etc.), and/or the like. In some embodiments, each of the one or more devices 520 might be a VNF module, a VNF component, or a VNF instance, or the like. The one or more containers 525 might comprise containers 525*a*-525*d*, each of which is a container for a corresponding one of the VNFC host agent 520*a*, the one or more storage adaptor devices 520*b*, the one or more network adaptor devices 520*c*, the one or more special function devices 520*d*, and/or the like.

The one or more hardware components 530 might comprise one or more networks 530*a*, one or more storage devices 530*b*, one or more network components/devices 530*c*, one or more special function devices 530*d*, and/or the like. In some embodiments, the one or more networks 530*a* might include, without limitation, one or more management networks 530*a* or any other suitable network, or the like. In some instances, the one or more storage devices 530*b* might include, but are not limited to, one or more storage drives, one or more Universal Serial Bus ("USB") drives, one or more storage network or storage network connections, and/or the like. The one or more storage network or storage network connections might include, without limitation, one or more storage area networks ("SANs"), one or more local area networks ("LANs"), one or more fiber channels ("FC") or FC over Ethernet ("FCoE"), and/or the like. In some instances, the one or more network components/devices 530*c* might include, without limitation, one or more gateway devices, one or more virtual networks, one or more external interfaces, and/or the like. In some cases, the one or more special function devices 530*d* might include, but are not limited to, one or more special function cards, one or more bearer oriented special function cards, and/or the like.

According to some embodiments, the VNFC host agent 520*a* might be communicatively coupled to the one or more networks 530*a* via container 525*a* and one or more management interfaces. The one or more storage adaptor devices 520*b* might be communicatively coupled to the one or more storage devices 530*b* via container 525*b* and one or more storage interfaces. The one or more network adaptor devices 520*c* might be communicatively coupled to the one or more network components/devices 530*c* via container 525*c* and one or more network and/or I/O interfaces. The one or more special function devices 520*d* might be communicatively coupled to the one or more special function devices 530*d* via container 525*d* and one or more network and/or I/O interfaces.

The main container 535, which is configured to contain at least the containers 525*a*-525*d* and the corresponding one or more devices 520*a*-520*d*, might communicatively couple the host computing system 505 with one or more virtual network functions-network functions virtualization infrastructure ("VN-nf") components. The one or more optional intra-host interfaces between VNFCs 540 might include, but are not limited to, one or more direct memory access ("DMA") interfaces 540*a*, one or more high speed serial interfaces 540*b*, and/or the like.

With reference to FIG. 6, method 600 might provide for scheduling and load sharing amongst two or more different VNFCs 605. As shown in the embodiment of FIG. 6, a first VNFC 605*a* might have running thereon a virtual CPU and memory 610*a*, a virtual storage host bus adapter ("HBA") 615*a* (which might be an interface to a drive, such as a SATA or disk drive, or the like), and a virtual network interface card ("virtual NIC" or "VNIC") 620*a*. The second VNFC 605*a* might similarly have running thereon a virtual CPU and memory 610*b*, a virtual storage HBA 615*b* (which, like HBA 615*a*, might be an interface to a drive, such as a SATA or disk drive, or the like), and a VNIC 620*b*. Although FIG. 6 shows two VNFCs 605*a* and 605*b*, the various embodiments are not so limited, and any suitable number of VNFCs 605 may be used or implemented, consistent with the techniques herein. In the embodiment of FIG. 6, each of virtual CPU and memory 610, virtual storage HBA 615, and/or VNIC 620 might be a VNF module, a VNF component, or a VNF instance, or the like.

In some embodiments, schedulers might "load share" the available schedule across different virtual functions. Both the host appliance and everything inside the container is "virtual" and perceives time and utilization based on what "schedule" it is provided. To this end, it is important to realize that the VNIC "being serviced" by the queue may not be serviced regularly, especially when higher priority activities occur (such as a hot VNF move or restore in high availability mode). Optionally, there are a few ways to lock the schedule. One way might be to modify the host scheduling function in such a way that the VNIC has the higher priority. Another way might be to modify the VNIC host drivers in such a way that the OAM and other time-based frames are not impacted by VNIC scheduling.

As shown in the embodiment of FIG. 6, a shared CPU serving schedule pool 625a might share CPU processes from each VNFC 605 (i.e., VNFCs 605a and 605b, or other VNFCs) that control one or more appliance host CPUs 630. In a similar manner, a shared NIC serving schedule pool 625b might share NIC processes from each VNFC 605 (i.e., VNFCs 605a and 605b, or other VNFCs) that control one or more appliance NICs 635. Likewise, a shared HBA serving schedule pool 625c might share HBA processes from each VNFC 605 (i.e., VNFCs 605a and 605b, or other VNFCs) that control one or more appliance HBAs 640. Each of the appliance host CPUs 630, the appliance NICs 635, and the appliance HBAs 640 are hardware components.

In FIG. 7, system 700 might comprise a customer premises 705, a host computing system 710 located at the customer premises 705 (in some cases, embodied within a customer premises equipment such as a NID or the like), and a container 715 running on the host computing system 710. Within the container 715, a virtual network function ("VNF") 720—which might include, without limitation, an operating system ("OS"), software, and/or an application, or the like—might be run or executed. In some embodiments, a host scheduler 730 might also be run or executed within the container 715. In some cases, a customer OAM server 735 might also be run or executed within the container 715. In some cases, system 700 might further comprise a service provider OAM server 740, which lies outside the host computing system 710 (in most cases, outside the customer premises 705; perhaps, in a network device between the customer premises 705 and a central office, or the like). The service provider OAM server 740, the host scheduler 730, and the customer OAM server 735 might be disposed within the data flow between the service provider network (and/or other networks, such as the Internet, or the like) and the VNF 720.

Typically, flow modifiers—such as VNIC schedulers and shapers, or the like—can distort OAM tracking results, including, but not limited to, Ethernet OAM frames (under Y.1731), two-way active measurement protocol ("TWAMP") OAM frames (under IETF RFC 5357), or any service activation test, and/or the like. Here, by placing a probe or OAM server (i.e., customer OAM server 735) in a container (i.e., container 715), everything in the data flow can always be tested. In some cases, how the container is served may be included in the performance evaluation. This configuration breaks the "transport" function boundary that normally exists in connectivity OAM servers. Placing the OAM (i.e., service provider OAM server 740) on the outside agent (e.g., a VNIC driver or the like (not shown)) is required to maintain legacy connectivity. In the case that internal function can no longer be trusted—especially for orchestration—, it may be necessary to make the OAM server's states available to the VNF (i.e., VNF 720) by the OAM server function.

Figure 8A:
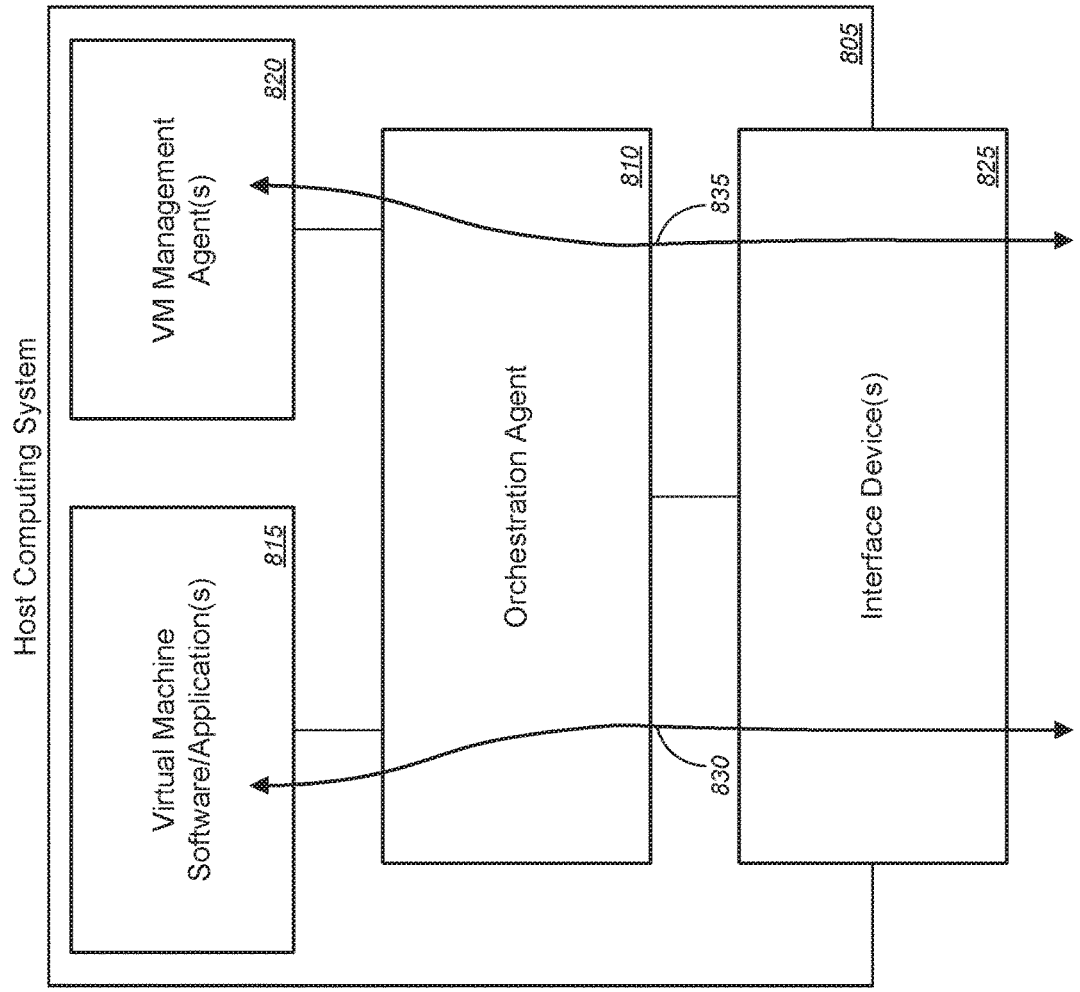
FIGS. 8A and 8B are block diagrams illustrating various systems for implementing applications management, based at least in part on OAM information monitored by dedicated OAM management agents, in accordance with various embodiments.
Figure 8B:
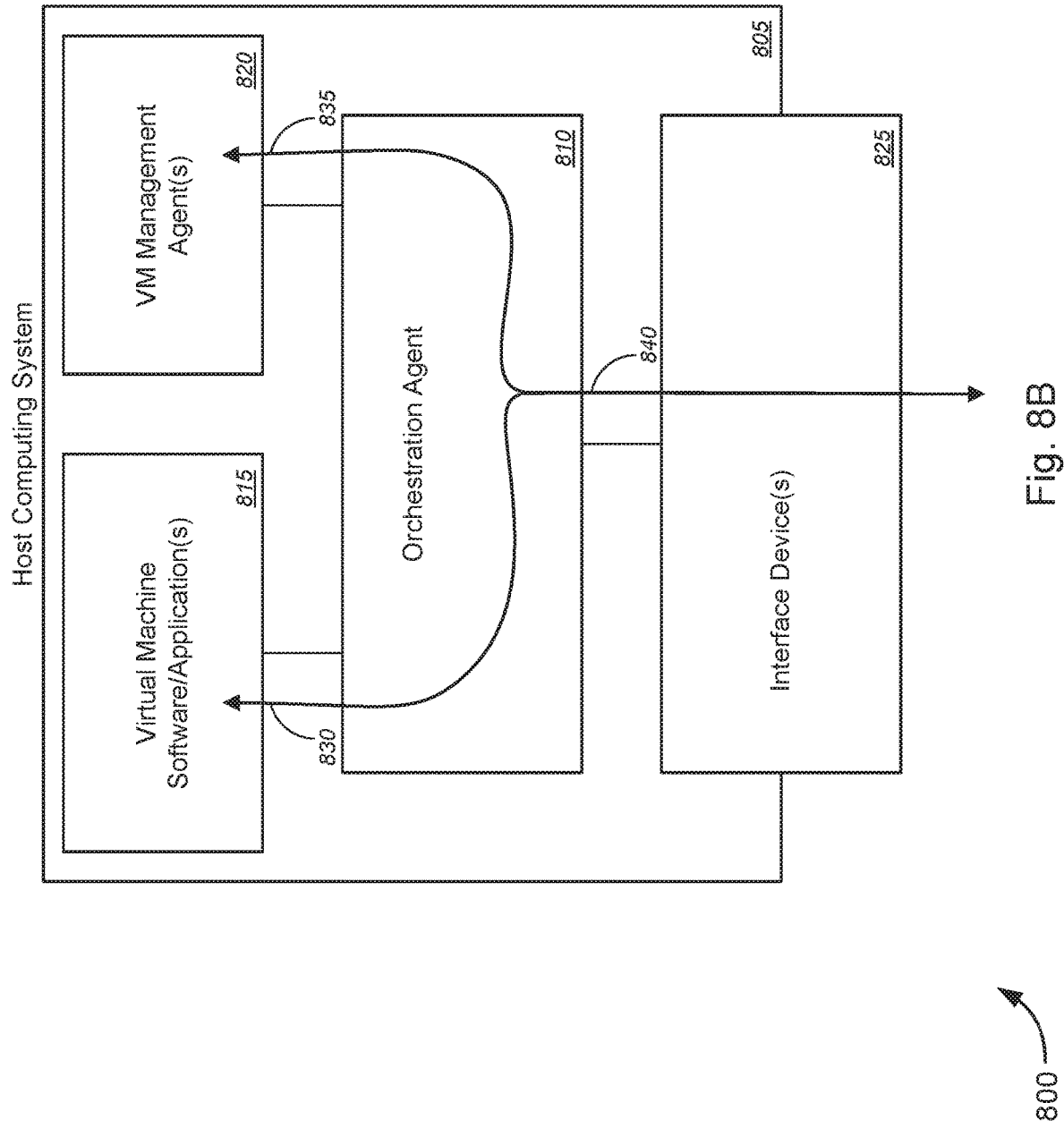

FIGS. 8A and 8B (collectively, "FIG. 8") are block diagrams illustrating various systems 800 for implementing applications management, based at least in part on OAM information monitored by dedicated OAM management agents, in accordance with various embodiments. In the embodiment of FIG. 8, system 800 might comprise a host computing system 805, an orchestration agent 810, one or more VM software applications 815, one or more VM management agents 820, and one or more interface devices 825. Each of the orchestration agent 810, the one or more VM software applications 815, and the one or more VM management agents 820 might be running on the host computing system. In some cases, the orchestration agent 810 might be communicatively coupled to each of the one or more VM software applications 815, each of the one or more VM management agents 820, and each of the one or more interface devices 825. In some embodiments, the one or more VM management agents 820 might correspond to the VNFC Host agent 520a as shown and described above with respect to FIG. 5.

According to various embodiments, each of the one or more VM management agents is a dedicated OAM management agent—that is, each of the one or more VM management agents is configured to only handle (i.e., receive, generate, send, and/or perform functions based on) OAM frames sent or received via the orchestration agent 810. This differs from typical VM systems in which the VM software applications might receive, send, and/or perform functions based on OAM frames, in addition to receiving, sending, and/or performing functions based on application frames. A problem with routing OAM frames through the VM software application is that when the VM software application is suspended (for any number of reasons), the OAM frames received by or not yet sent by the VM software application expires, dies, or is otherwise lost. Here, only the VM management agents 820 receive send, and/or perform functions based on the OAM frames (and in some cases, generate OAM frames). By using a dedicated OAM management agent, such as shown in the embodiment of FIG. 8, even if the VM software application is suspended (for whatever reason), the OAM frames remain unaffected.

In some embodiments, the one or more VM software applications 815 might include, without limitation, one or more VM software, one or more VM applications, and/or a combination of these. In some instances, the orchestration agent 810 might include, but is not limited to, an orchestrator (e.g., orchestrator 265 in FIG. 2 or the like), a hypervisor (e.g., hypervisor 235 in FIG. 2 or the like), an operating system ("OS") of the host computing system (also referred to as "host OS"), a container (e.g., container 535 in FIG. 5 or the like), an input/output ("I/O") scheduler function, a virtual Ethernet function, a host scheduler, a shim function, and/or the like.

According to some embodiments, the one or more interface devices 825 might include, without limitation, one or more physical Ethernet ports, one or more port acceleration hardware, and/or the like, and all of the one or more interface devices 825 might be components of the host computing system 805 or might be devices separate from yet communicatively coupled to the host computing system 805. In some cases, some of the one or more interface devices 825 might be components of the host computing system 805, while others of the one or more interface devices 825 might be devices separate from yet communicatively coupled to the host computing system 805. The one or more interface devices 825 might communicatively couple the orchestration agent 810 with one or more hardware components (not shown in FIG. 8). In some instances, the one or more hardware components might include, without limitation, one or more storage devices, one or more networks, one or more network components/devices, one or more special function devices, and/or the like. In some cases, the one or more storage devices might include, but are not limited to, one or more storage drives, one or more Universal Serial Bus ("USB") drives, one or more storage network or storage network connections, and/or the like. The one or more storage network or storage network connections might include, without limitation, one or more storage area networks ("SANs"), one or more local area networks ("LANs"), one or more fiber channels ("FC") or FC over Ethernet ("FCoE"), and/or the like. In some instances, the one or more network components/devices might include, without limitation, one or more gateway devices, one or more virtual networks, one or more external interfaces, and/or the like. In some cases, the one or more special function devices might include, but are not limited to, one or more special function cards, one or more bearer oriented special function cards, and/or the like.

In one set of embodiments, as shown in the embodiment of FIG. 8A, normal application frame flow might be sent and received along one channel(s) (i.e., channel(s) 830), while the OAM frame flow might be sent and received along another channel(s) (i.e., separate channel(s) 835) that is separate from the one channel(s). In other words, the one channel(s) (i.e., channel(s) 830) might allow (only) normal application frame flow to be sent and received between each of the one or more VM software applications 815 and the one or more hardware components, via the orchestration agent 810 and the one or more interface devices 825. The other channel(s) (i.e., channel(s) 835) might allow (only) OAM frame flow to be sent and received between each of the one or more VM management agents 820 and the one or more hardware components, via the orchestration agent 810 and the one or more interface devices 825.

In an alternative set of embodiments, as shown in the embodiment of FIG. 8B, both the normal application frame flow and the OAM frame flow might be sent from and received by the orchestration agent 810, to and from the one or more interface devices 825 (including, but not limited to, physical Ethernet port and port acceleration hardware, and/or the like), and to and from the one or more hardware components, along one same channel(s) (i.e., channel(s) 840). Each channel (i.e., each of channel(s) 840) might be forked at the orchestration agent 810, such that the normal application frame flow may be sent from and received by the orchestration agent 810, to and from each of the one or more VM software applications 815, along one channel(s) (i.e., channel(s) 830), while the OAM frame flow may be sent from and received by the orchestration agent 810, to and from each of the one or more VM management agents 820, along another channel(s) (i.e., separate channel(s) 835). In other words, each of the one channel(s) (i.e., channel(s) 840) might allow both the normal application frame flow and the OAM frame flow to be sent and received between the orchestration agent 840 and the one or more hardware components, via the one or more interface devices 825. At the orchestration agent 810, each of the channel(s) 840 is forked into the channel(s) 830 and the channel(s) 835. The channel(s) 830 might allow (only) normal application frame flow to be sent and received between each of the one or more VM software applications 815 and the orchestration agent 810, while the channel(s) 835 might allow (only) OAM frame flow to be sent and received between each of the one or more VM management agents 820 and the orchestration agent 810.

In some embodiments, the one or more VM management agents 820 might each include a multi-layer personality OAM server function. Here, as described above with respect to FIG. 1, "personality" in "multi-layer personality OAM server function" might refer to the OAM server function that monitors address, or monitors frames, and/or the like. In a similar manner as above, "multi-personality" might refer to simultaneous monitoring of address and frames, and/or other characteristics or types of information. "Multi-layer" or "multi-layer OAM monitoring function" (as in FIG. 1) might refer to simultaneous monitoring of multiple layers (e.g., simultaneous monitoring of layer 2 and layer 3, and/or the like) and/or simultaneous monitoring of any combination of Ethernet OAM information, IP OAM information, Internet protocol/multiprotocol label switching ("IP/MPLS") OAM information, MPLS OAM information, two-way active measurement protocol ("TWAMP") OAM information, IPsec information, virtual private network information, application layer information, and/or the like. Because multiple types of OAM and other information may be monitored (in some cases simultaneously), the OAM servers and/or the VM management agents 820 might be referred to as being "multi-lingual." In some cases, each of the one or more VM management agents 820 might comprise an OAM server.

In some aspects, the one or more VM management agents 820 (as multi-layer personality OAM servers or having multi-layer personality OAM server function) might include new virtual states for CMs, an OAM frame generator, hot upgradeable OAM settings, and/or the like, as described in detail below with respect to FIGS. 9-11.

Figure 9:
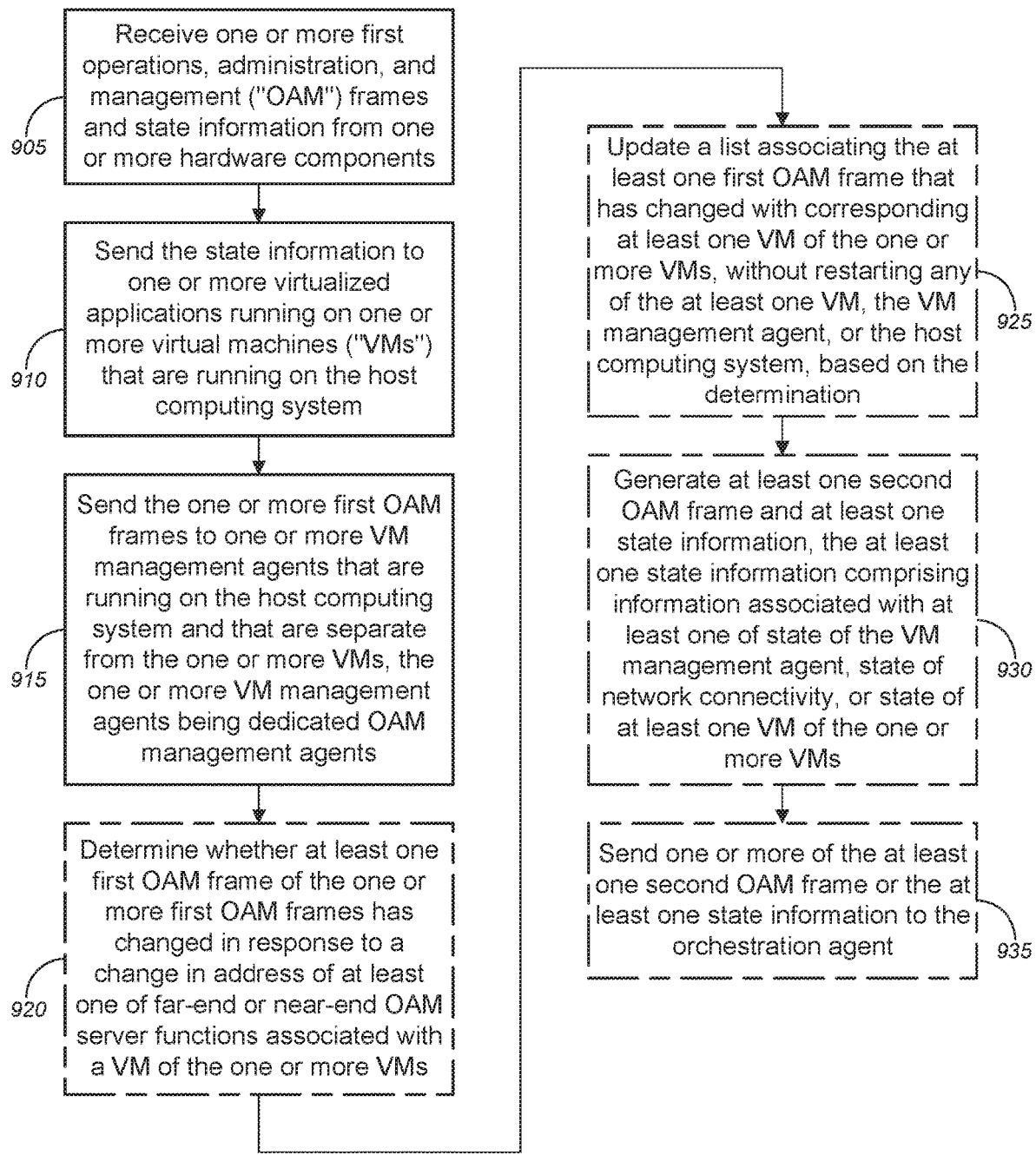
FIG. 9 is a flow diagram illustrating a method for implementing monitoring or transport of OAM information by dedicated OAM management agents, in accordance with various embodiments.

FIG. 9 is a flow diagram illustrating a method 900 for implementing monitoring or transport of OAM information by dedicated OAM management agents, in accordance with various embodiments. While the techniques and procedures are depicted and/or described in a certain order for purposes of illustration, it should be appreciated that certain procedures may be reordered and/or omitted within the scope of various embodiments. Moreover, while the method illustrated by FIG. 9 can be implemented by or with (and, in some cases, are described below with respect to) the systems 100-800 of FIGS. 1-8, respectively (or components thereof), such methods may also be implemented using any suitable hardware implementation. Similarly, while each of the systems 100-800 (and/or components thereof) of FIGS. 1-8, respectively, can operate according to the method illustrated by FIG. 9 (e.g., by executing instructions embodied on a computer readable medium), the systems 100-800 can each also operate according to other modes of operation and/or perform other suitable procedures.

According to some embodiments, method 900 might comprise, at block 905, receiving, with an orchestration agent running on a host computing system, one or more first operations, administration, and management ("OAM") frames and one or more first state information from one or more hardware components. In some instances, the one or more first OAM frames might comprise at least one of one or more Ethernet OAM frames, one or more Internet protocol/multiprotocol label switching ("IP/MPLS") OAM frames, one or more MPLS OAM frames, one or more two-way active measurement protocol ("TWAMP") OAM, or any other suitable OAM frame types normally received and acted upon by a OAM maintenance or server function, and/or the like. In some cases, the one or more first state information comprises port hardware information comprising one or more of loss of signal ("LOS") notifications (e.g., under IEEE 802.3, which is incorporated herein by reference in its entirety), jabber, switch monitoring ("SMON") counters (e.g., under IETF RFC 2613, which is incorporated herein by reference in its entirety), remote network monitoring ("RMON") counters (e.g., under IETF RFC 2819 and 4502, which are incorporated herein by reference in their entirety), vendor-specific implementation of committed information rate ("CIR") and extended information rate ("EIR") (e.g., under MEF 10.x, which is incorporated herein by reference in its entirety), policer or policy information, shaper information, alarm indication signal ("AIS") notifications, carrier group alarm ("CGA") notifications, fragmented frames, flow level statistics, maintenance entity information, functionality information, ping information, trace router information, loopback information, information on test frames, information on connectivity, information on synthetic frames, or label-switched path ("LSP") OAM channel tunnel status information (e.g., under IETF RFC 6427, which is incorporated herein by reference in its entirety).

At block 910, method 900 might comprise sending, with the orchestration agent, the one or more first state information to one or more virtualized applications running on one or more virtual machines ("VMs") that are running on the host computing system. In some cases, sending the one or more first state information to the one or more virtualized applications running on the one or more VMs might include sending the one or more first state information to the far end (OAM server function or the like) via time, length, and value ("TLV") fields of the one or more OAM frames, the TLV fields being used to convey information. Method 900 might further comprise sending, with the orchestration agent, the one or more first OAM frames to one or more VM management agents that are running on the host computing system and that are separate from the one or more VMs, the one or more VM management agents being dedicated OAM management agents. In some cases, each of the one or more VM management agents might be configured to perform a multi-layer OAM monitoring. In some instances, each of the one or more VM management agents might be configured to perform a multi-layer OAM monitoring, whereby a single state machine for the orchestration and management function might have a combined view of the performance of the OAM frames at the physical, Ethernet, IP, MPLS, and/or application layers.

According to some embodiments, the orchestration agent might be configured to perform an OAM frame mapping function, and sending, with the orchestration agent, the one or more first OAM frames to the one or more VM management agents might comprise sending, with the orchestration agent, the one or more first OAM frames to the one or more VM management agents, using the OAM frame mapping function. In other words, the orchestration agent might utilize the OAM frame mapping function to forward incoming OAM frames to the virtual machine management client function (i.e., the VM management agent 820).

In some embodiments, the one or more first state information might comprise OAM source and destination information. In some cases, receiving the one or more first OAM frames and the one or more first state information from the one or more hardware components might comprise receiving, with the orchestration agent, the one or more first OAM frames and the OAM source and destination information from the one or more hardware components, and passing the one or more first OAM frames and the OAM source and destination information, along separate channels through one or more interface ports of the host computing system (as shown, e.g., in the non-limiting embodiment of FIG. 8A). As shown in the embodiment of FIG. 8A, the normal application frame flow is sent and received along one channel (i.e., channel 830), while the OAM frame flow is sent and received along another channel (i.e., separate channel 835).

In alternative cases, receiving the one or more first OAM frames and the one or more first state information from the one or more hardware components might comprise receiving, with the orchestration agent, the one or more first OAM frames and the OAM source and destination information from the one or more hardware components along a same channel through one or more interface ports of the host computing system, and passing, with the orchestration agent, the one or more first OAM frames and the OAM source and destination information, along separate, forked channels from the orchestration agent (as shown, e.g., in the non-limiting embodiment of FIG. 8B). As shown in the embodiment of FIG. 8B, both the normal application frame flow and the OAM frame flow are sent from and received by the orchestration agent 810, to and from the one or more interface devices 825 (including, but not limited to, physical Ethernet port and port acceleration hardware, and/or the like), along one same channel (i.e., channel 840). This channel (i.e., channel 840) is forked at the orchestration agent 810, such that the normal application frame flow is sent from and received by the orchestration agent 810, to and from the VM software/application(s) 815, along one channel (i.e., channel 830), while the OAM frame flow is sent from and received by the orchestration agent 810, to and from the VM management agent(s) 820, along another channel (i.e., separate channel 835).

In some (optional) embodiments, method 900 might further comprise determining, with a VM management agent of the one or more VM management agents, whether at least one first OAM frame of the one or more first OAM frames has changed in response to a change in address of at least one of far-end or near-end OAM server functions associated with a VM of the one or more VMs (block 920). At (optional) block 925, method 900 might comprise updating, with the VM management agent, a list associating the at least one first OAM frame that has changed with corresponding at least one VM of the one or more VMs, without restarting any of the at least one VM, the VM management agent, the one or more VM management agents, and/or the host computing system, based on a determination that at least one first OAM frame of the one or more first OAM frames has changed. Here, the at least one OAM frame that has changed is among the one or more first OAM frames that are received by the VM management agent via the orchestration agent (from the hardware components) at block 905, which differs from the case with respect to blocks 1015 and 1020 of FIG. 10.

Merely by way of example, in some (optional) aspects, method 900 might further comprise, at block 930, generating, with a VM management agent of the one or more VM management agents, at least one second OAM frame and at least one second state information, the at least one second state information comprising information associated with at least one of state of the VM management agent, state of the one or more VM management agents, state of network connectivity, and/or state of at least one VM of the one or more VMs. At (optional) block 935, method 900 might comprise sending, with the VM management agent, one or more of the at least one second OAM frame and/or the at least one second state information to the orchestration agent.

Figure 10:
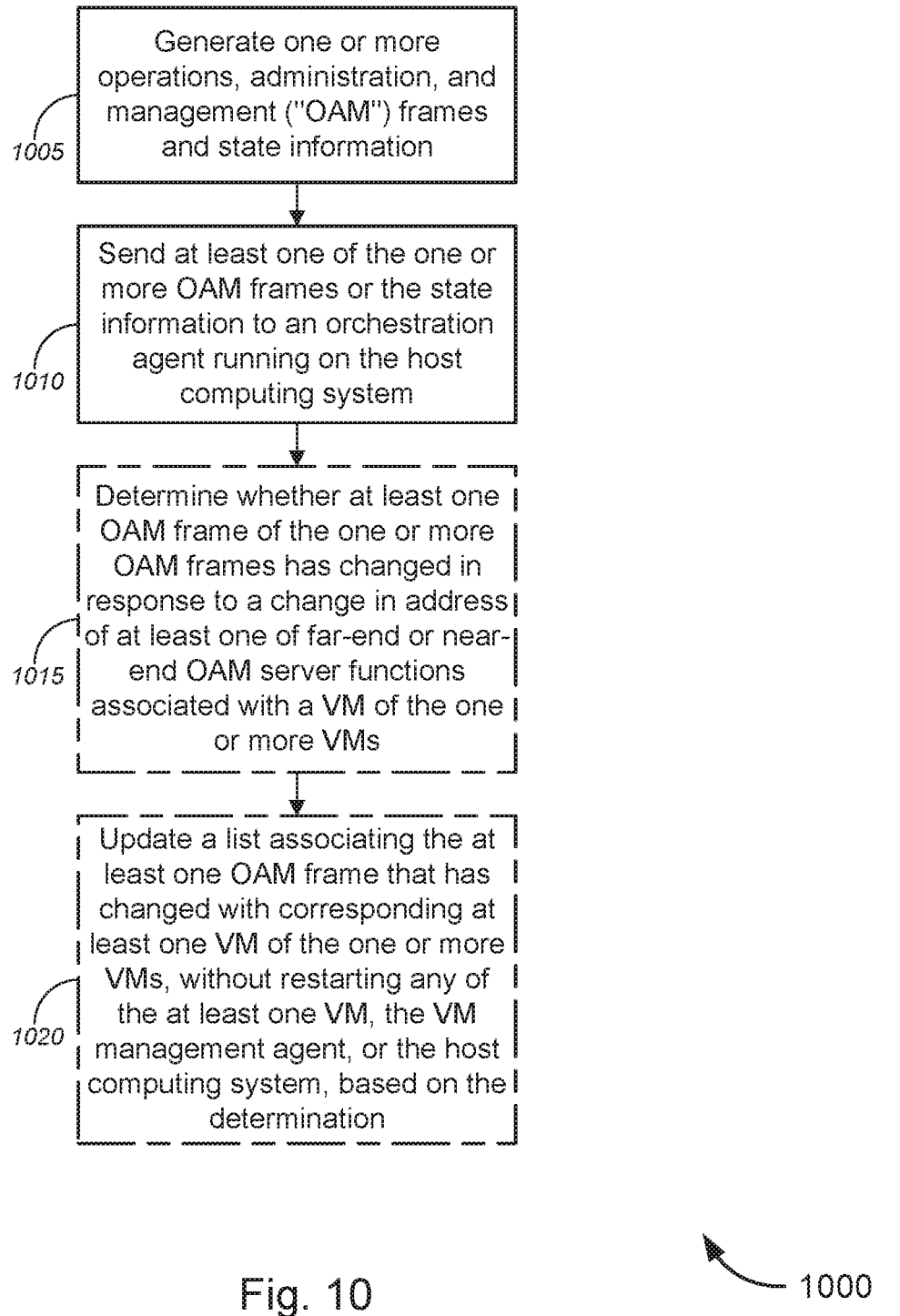
FIG. 10 is a flow diagram illustrating a method for generating OAM frames using a VM management agent, in accordance with various embodiments.

FIG. 10 is a flow diagram illustrating a method 1000 for generating OAM frames using a VM management agent, in accordance with various embodiments. While the techniques and procedures are depicted and/or described in a certain order for purposes of illustration, it should be appreciated that certain procedures may be reordered and/or omitted within the scope of various embodiments. Moreover, while the method illustrated by FIG. 10 can be implemented by or with (and, in some cases, are described below with respect to) the systems 100-800 of FIGS. 1-8, respectively (or components thereof), such methods may also be implemented using any suitable hardware implementation. Similarly, while each of the systems 100-800 (and/or components thereof) of FIGS. 1-8, respectively, can operate according to the method illustrated by FIG. 10 (e.g., by executing instructions embodied on a computer readable medium), the systems 100-800 can each also operate according to other modes of operation and/or perform other suitable procedures.

With reference to FIG. 10, in some embodiments, method 1000 might comprise, at block 1005, generating, with a virtual machine ("VM") management agent of one or more VM management agents, one or more operations, administration, and management ("OAM") frames and one or more state information. The one or more VM management agents might be running on a host computing system and might be separate from one or more VMs on which one or more virtualized applications are being run (on the host computing system). At block 1010, method 1000 might further comprise sending, with the VM management agent, at least one of the one or more OAM frames or the one or more state information to an orchestration agent running on the host computing system. Unlike (optional) blocks 930 and 935 of method 900 in FIG. 9, blocks 1005 and 1010 of method 1000 of FIG. 10 may be performed and/or implemented without necessarily performing the receiving and sending processes as described above with respect to blocks 905-915 of method 900 in FIG. 9.

In some embodiments, the one or more state information might comprise information associated with at least one of state of the VM management agent, state of the one or more VM management agents, state of network connectivity, and/or state of at least one VM of the one or more VMs. According to some embodiments, the one or more OAM frames might comprise at least one of one or more Ethernet OAM frames, one or more Internet protocol/multiprotocol label switching ("IP/MPLS") OAM frames, one or more MPLS OAM frames, or one or more two-way active measurement protocol ("TWAMP") OAM frames, or any other suitable OAM frame types normally received and acted upon by a OAM maintenance or server function, and/or the like. In some instances, each of the one or more VM management agents might be configured to perform a multi-layer OAM monitoring function. In some cases, multi-layer OAM monitoring might be performed such that a single state machine for the orchestration and management function might have a combined view of the performance of the OAM frames at the physical, Ethernet, IP, MPLS, and/or application layers.

According to some embodiments, method 1000 might further comprise, at (optional) block 1015, determining, with the VM management agent, whether at least one OAM frame of the one or more OAM frames has changed in response to a change in address of at least one of far-end or near-end OAM server functions associated with a VM of the one or more VMs. At (optional) block 1020, method 1000 might further comprise updating, with the VM management agent, a list associating the at least one OAM frame that has changed with corresponding at least one VM of the one or more VMs, without restarting any of the at least one VM, the VM management agent, the one or more VM management agents, or the host computing system, based on a determination that at least one OAM frame of the one or more OAM frames has changed. Here, the at least one OAM frame that has changed is among the one or more OAM frames that are generated by the VM management agent at block 1005, which differs from the case with respect to blocks 920 and 925 of FIG. 9.

Figure 11:
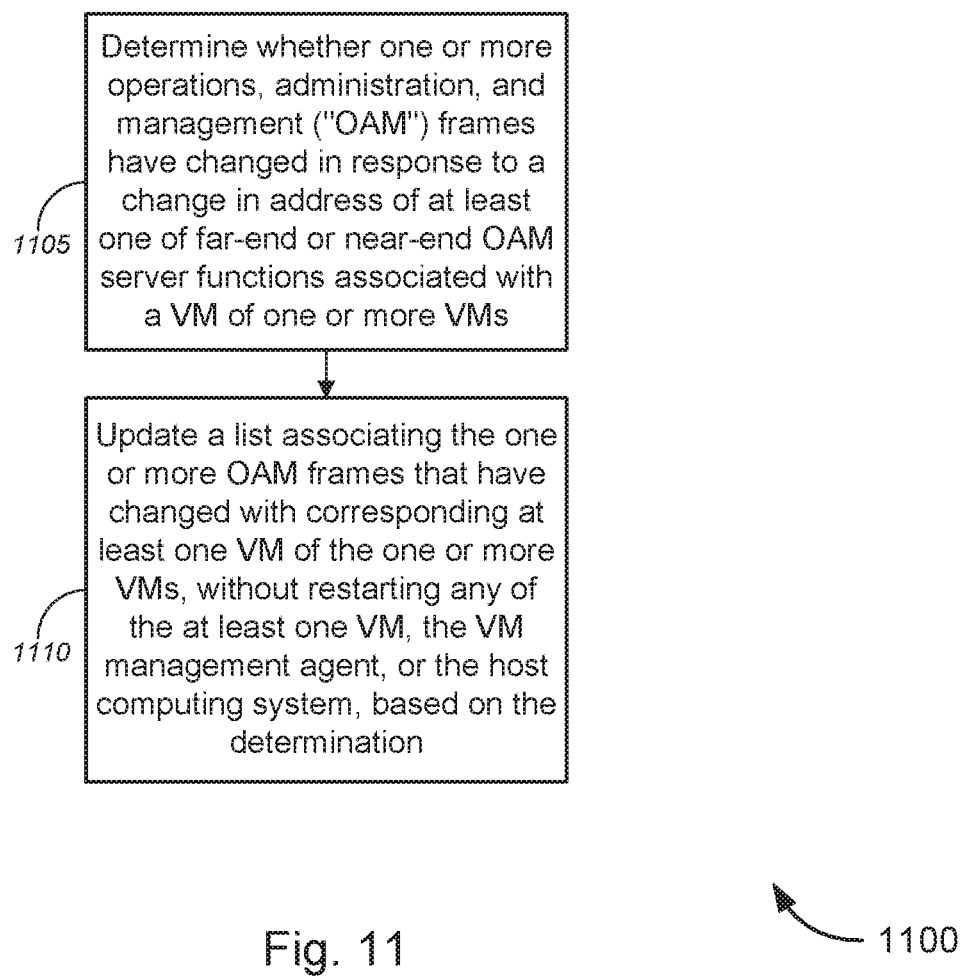
FIG. 11 is a flow diagram illustrating a method for implementing hot upgradeable OAM settings, in accordance with various embodiments.

FIG. 11 is a flow diagram illustrating a method 1100 for implementing hot upgradeable OAM settings, in accordance with various embodiments. While the techniques and procedures are depicted and/or described in a certain order for purposes of illustration, it should be appreciated that certain procedures may be reordered and/or omitted within the scope of various embodiments. Moreover, while the method illustrated by FIG. 11 can be implemented by or with (and, in some cases, are described below with respect to) the systems 100-800 of FIGS. 1-8, respectively (or components thereof), such methods may also be implemented using any suitable hardware implementation. Similarly, while each of the systems 100-800 (and/or components thereof) of FIGS. 1-8, respectively, can operate according to the method illustrated by FIG. 11 (e.g., by executing instructions embodied on a computer readable medium), the systems 100-800 can each also operate according to other modes of operation and/or perform other suitable procedures.

In the embodiment of FIG. 11, at block 1105, method 1100 might comprise determining, with a virtual machine ("VM") management agent of one or more VM management agents, whether one or more operations, administration, and management ("OAM") frames have changed in response to a change in address of at least one of far-end or near-end OAM server functions associated with a VM of the one or more VMs. The one or more VM management agents might be running on a host computing system and might be separate from one or more VMs on which one or more virtualized applications are being run. Method 1100, at block 1110, might comprise updating, with the VM management agent, a list associating the one or more OAM frames that have changed with corresponding at least one VM of the one or more VMs, without restarting any of the at least one VM, the VM management agent, the one or more VM management agents, and/or the host computing system, based on a determination that one or more OAM frames have changed. In typical OAM systems, when there is a change in the address of at least one of far-end or near-end OAM server functions associated with a VM of the one or more VMs, at least one VM, the VM management agent, and/or the host computing system must be shut down and restarted for the changes to take effect. The processes of blocks 1105 and 1110 allow for hot upgradeability of OAM settings, and allows for the VM to swap addresses and for the OAM server function to be adaptable without restarting any of the VM, the VM management agent, and/or the host computer system when it is determined that OAM frame(s) have changed in response to change in the address of certain OAM server functions associated with a VM(s).

Unlike (optional) blocks 930 and 935 of method 900 in FIG. 9 and (optional) blocks 1015 and 1020 of method 1000 in FIG. 10, blocks 1105 and 1110 of method 1100 of FIG. 11 may be performed and/or implemented without necessarily performing the receiving and sending processes as described above with respect to blocks 905-915 of method 900 in FIG. 9, and/or without necessarily performing the processes of generating and sending OAM frame(s) and/or state information as described above with respect to blocks 930-935 of method 900 in FIG. 9 and as described above with respect to blocks 1005-1010 of method 1000 in FIG. 10.

In some embodiments, the one or more OAM frames might comprise at least one of one or more Ethernet OAM frames, one or more Internet protocol/multiprotocol label switching ("IP/MPLS") OAM frames, one or more MPLS OAM frames, or one or more two-way active measurement protocol ("TWAMP") OAM frames, or any other suitable OAM frame types normally received and acted upon by a OAM maintenance or server function, and/or the like. In some cases, each of the one or more VM management agents might be configured to perform a multi-layer OAM monitoring function. In some cases, multi-layer OAM monitoring might be performed such that a single state machine for the orchestration and management function might have a combined view of the performance of the OAM frames at the physical, Ethernet, IP, MPLS, and/or application layers.

Figure 12:
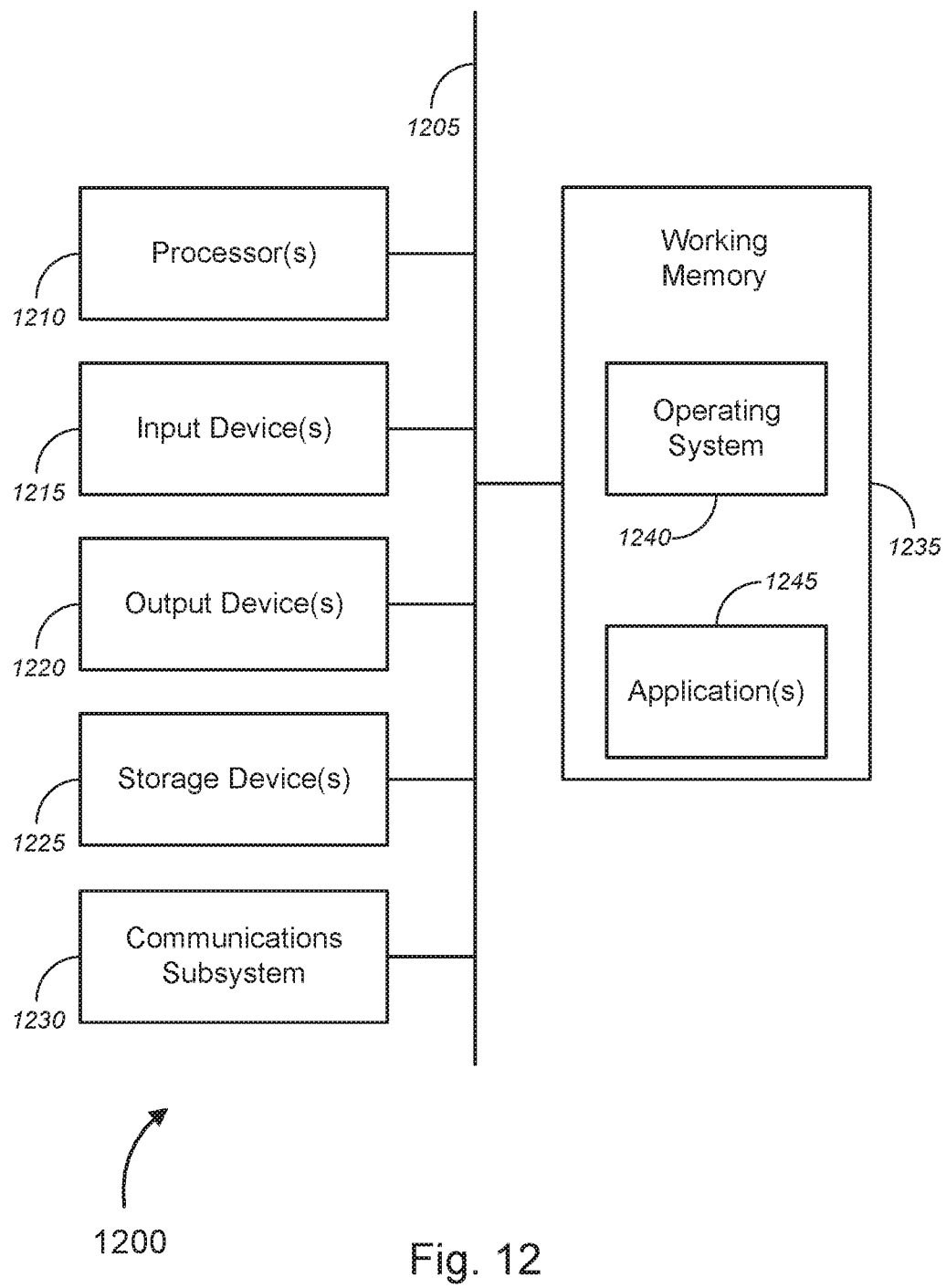
FIG. 12 is a block diagram illustrating an exemplary computer or system hardware architecture, in accordance with various embodiments.

FIG. 12 is a block diagram illustrating an exemplary computer or system hardware architecture, in accordance with various embodiments. FIG. 12 provides a schematic illustration of one embodiment of a computer system 1200 of the service provider system hardware that can perform the methods provided by various other embodiments, as described herein, and/or can perform the functions of computer or hardware system (i.e., host system) 205, 405, 505, and/or 710, or of any other device (e.g., Gateway 130, NID 135/140, device on which VMs, VM management agents, and/or orchestration agents are run, etc.), as described above. It should be noted that FIG. 12 is meant only to provide a generalized illustration of various components, of which one or more (or none) of each may be utilized as appropriate. FIG. 12, therefore, broadly illustrates how individual system elements may be implemented in a relatively separated or relatively more integrated manner.

The computer or hardware system 1200—which might represent an embodiment of the computer or hardware system or host system 205, 405, 505, and/or 710, or of any other device (e.g., Gateway 130, NID 135/140, device on which VMs, VM management agents, and/or orchestration agents are run, etc.), described above with respect to FIGS. 1, 2, and 4-8—is shown comprising hardware elements that can be electrically coupled via a bus 1205 (or may otherwise be in communication, as appropriate). The hardware elements may include one or more processors 1210, including, without limitation, one or more general-purpose processors and/or one or more special-purpose processors (such as digital signal processing chips, graphics acceleration processors, and/or the like); one or more input devices 1215, which can include, without limitation, a mouse, a keyboard and/or the like; and one or more output devices 1220, which can include, without limitation, a display device, a printer, and/or the like.

The computer or hardware system 1200 may further include (and/or be in communication with) one or more storage devices 1225, which can comprise, without limitation, local and/or network accessible storage, and/or can include, without limitation, a disk drive, a drive array, an optical storage device, solid-state storage device such as a random access memory ("RAM") and/or a read-only memory ("ROM"), which can be programmable, flash-updateable and/or the like. Such storage devices may be configured to implement any appropriate data stores, including, without limitation, various file systems, database structures, and/or the like.

The computer or hardware system 1200 might also include a communications subsystem 1230, which can include, without limitation, a modem, a network card (wireless or wired), an infra-red communication device, a wireless communication device and/or chipset (such as a Bluetooth™ device, an 802.11 device, a WiFi device, a WiMax device, a WWAN device, cellular communication facilities, etc.), and/or the like. The communications subsystem 1230 may permit data to be exchanged with a network (such as the network described below, to name one example), with other computer or hardware systems, and/or with any other devices described herein. In many embodiments, the computer or hardware system 1200 will further comprise a working memory 1235, which can include a RAM or ROM device, as described above.

The computer or hardware system 1200 also may comprise software elements, shown as being currently located within the working memory 1235, including an operating system 1240, device drivers, executable libraries, and/or other code, such as one or more application programs 1245, which may comprise computer programs provided by various embodiments (including, without limitation, hypervisors, VMs, and the like), and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be encoded and/or stored on a non-transitory computer readable storage medium, such as the storage device(s) 1225 described above. In some cases, the storage medium might be incorporated within a computer system, such as the system 1200. In other embodiments, the storage medium might be separate from a computer system (i.e., a removable medium, such as a compact disc, etc.), and/or provided in an installation package, such that the storage medium can be used to program, configure and/or adapt a general purpose computer with the instructions/code stored thereon. These instructions might take the form of executable code, which is executable by the computer or hardware system 1200 and/or might take the form of source and/or installable code, which, upon compilation and/or installation on the computer or hardware system 1200 (e.g., using any of a variety of generally available compilers, installation programs, compression/decompression utilities, etc.) then takes the form of executable code.

It will be apparent to those skilled in the art that substantial variations may be made in accordance with specific requirements. For example, customized hardware (such as programmable logic controllers, field-programmable gate arrays, application-specific integrated circuits, and/or the like) might also be used, and/or particular elements might be implemented in hardware, software (including portable software, such as applets, etc.), or both. Further, connection to other computing devices such as network input/output devices may be employed.

As mentioned above, in one aspect, some embodiments may employ a computer or hardware system (such as the computer or hardware system 1200) to perform methods in accordance with various embodiments of the invention. According to a set of embodiments, some or all of the procedures of such methods are performed by the computer or hardware system 1200 in response to processor 1210 executing one or more sequences of one or more instructions (which might be incorporated into the operating system 1240 and/or other code, such as an application program 1245) contained in the working memory 1235. Such instructions may be read into the working memory 1235 from another computer readable medium, such as one or more of the storage device(s) 1225. Merely by way of example, execution of the sequences of instructions contained in the working memory 1235 might cause the processor(s) 1210 to perform one or more procedures of the methods described herein.

The terms "machine readable medium" and "computer readable medium," as used herein, refer to any medium that participates in providing data that causes a machine to operate in a specific fashion. In an embodiment implemented using the computer or hardware system 1200, various computer readable media might be involved in providing instructions/code to processor(s) 1210 for execution and/or might be used to store and/or carry such instructions/code (e.g., as signals). In many implementations, a computer readable medium is a non-transitory, physical, and/or tangible storage medium. Such a medium may take many forms, including, but not limited to, non-volatile media, volatile media, and transmission media. Non-volatile media includes, for example, optical and/or magnetic disks, such as the storage device(s) 1225. Volatile media includes, without limitation, dynamic memory, such as the working memory 1235. Transmission media includes, without limitation, coaxial cables, copper wire and fiber optics, including the wires that comprise the bus 1205, as well as the various components of the communication subsystem 1230 (and/or the media by which the communications subsystem 1230 provides communication with other devices). Hence, transmission media can also take the form of waves (including without limitation radio, acoustic and/or light waves, such as those generated during radio-wave and infra-red data communications).

Common forms of physical and/or tangible computer readable media include, for example, a floppy disk, a flexible disk, a hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read instructions and/or code.

Various forms of computer readable media may be involved in carrying one or more sequences of one or more instructions to the processor(s) 1210 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer or hardware system 1200. These signals, which might be in the form of electromagnetic signals, acoustic signals, optical signals, and/or the like, are all examples of carrier waves on which instructions can be encoded, in accordance with various embodiments of the invention.

The communications subsystem 1230 (and/or components thereof) generally will receive the signals, and the bus 1205 then might carry the signals (and/or the data, instructions, etc. carried by the signals) to the working memory 1235, from which the processor(s) 1205 retrieves and executes the instructions. The instructions received by the working memory 1235 may optionally be stored on a storage device 1225 either before or after execution by the processor(s) 1210.

While certain features and aspects have been described with respect to exemplary embodiments, one skilled in the art will recognize that numerous modifications are possible. For example, the methods and processes described herein may be implemented using hardware components, software components, and/or any combination thereof. Further, while various methods and processes described herein may be described with respect to particular structural and/or functional components for ease of description, methods provided by various embodiments are not limited to any particular structural and/or functional architecture but instead can be implemented on any suitable hardware, firmware and/or software configuration. Similarly, while certain functionality is ascribed to certain system components, unless the context dictates otherwise, this functionality can be distributed among various other system components in accordance with the several embodiments.

Moreover, while the procedures of the methods and processes described herein are described in a particular order for ease of description, unless the context dictates otherwise, various procedures may be reordered, added, and/or omitted in accordance with various embodiments. Moreover, the procedures described with respect to one method or process may be incorporated within other described methods or processes; likewise, system components described according to a particular structural architecture and/or with respect to one system may be organized in alternative structural architectures and/or incorporated within other described systems. Hence, while various embodiments are described with—or without—certain features for ease of description and to illustrate exemplary aspects of those embodiments, the various components and/or features described herein with respect to a particular embodiment can be substituted, added and/or subtracted from among other described embodiments, unless the context dictates otherwise. Consequently, although several exemplary embodiments are described above, it will be appreciated that the invention is intended to cover all modifications and equivalents within the scope of the following claims.

What is claimed is:

1. A method, comprising:
communicating through an orchestration agent running on a host computing system, by a VM of one or more VMs, with a far-end or near-end OAM server function;
receiving, with an the orchestration agent running on a the host computing system, one or more first operations, administration, and management ("OAM") frames and one or more first state information from one or more hardware components;
sending, with the orchestration agent, the one or more first state information to one or more virtualized applications running on the one or more virtual machines ("VMs") that are running on the host computing system;
sending, with the orchestration agent, the one or more first OAM frames to one or more VM management agents that are running on the host computing system and that are separate from the one or more VMs, the one or more VM management agents being dedicated OAM management agents;
determining, with a VM management agent of one or more VM management agents, whether at least one first OAM frame of the one or more first OAM frames has changed in response to a change in address of the at least one of far-end or near-end OAM server functions associated with a VM of the one or more VMs; and
updating, with the VM management agent, a mapping of the at least one of far-end or near-end OAM server functions associated with the at least one first OAM frame that has changed with corresponding at least one VM of the one or more VMs, without restarting any of the at least one VM, the VM management agent, the one or more VM management agents, or the host computing system, based on a determination that at least one first QAM frame of the one or more first QAM frames has changed; and continuously updating, with the VM management agent, a mapping of the at least one of far-end or near-end OAM server functions associated with any further OAM frames that have changed, without restarting any of the at least one VM, the VM management agent, the one or more VM management agents, or the host computing system.

2. The method of claim 1, wherein the orchestration agent is configured to perform an OAM frame mapping function, wherein sending, with the orchestration agent, the one or more first OAM frames to the one or more VM management agents comprises sending, with the orchestration agent, the one or more first OAM frames to the one or more VM management agents, using the OAM frame mapping function.

3. The method of claim 1, wherein the one or more first state information comprises OAM source and destination information, wherein receiving the one or more first OAM frames and the one or more first state information from the one or more hardware components comprises receiving, with the orchestration agent, the one or more first OAM frames and the OAM source and destination information from the one or more hardware components along a same channel through one or more interface ports of the host computing system, and passing, with the orchestration agent, the one or more first OAM frames and the OAM source and destination information, along separate, forked channels from the orchestration agent.

4. The method of claim 1, wherein the one or more first state information comprises OAM source and destination information, wherein receiving the one or more first OAM frames and the one or more first state information from the one or more hardware components comprises receiving, with the orchestration agent, the one or more first OAM frames and the OAM source and destination information from the one or more hardware components, and passing the one or more first OAM frames and the OAM source and destination information, along separate channels through one or more interface ports of the host computing system.

5. The method of claim 1, wherein the one or more first OAM frames comprise at least one of one or more Ethernet OAM frames, one or more Internet protocol/multiprotocol label switching ("IP/MPLS") OAM frames, one or more MPLS OAM frames, or one or more two-way active measurement protocol ("TWAMP") OAM frames.

6. The method of claim 1, wherein each of the one or more VM management agents is configured to perform a multi-layer OAM monitoring function.

7. The method of claim 1, wherein the one or more first state information comprises port hardware information comprising one or more of loss of signal ("LOS") notifications, jabber, switch monitoring ("SMON") counters, remote network monitoring ("RMON") counters, vendor-specific implementation of committed information rate ("CIR") and extended information rate ("EIR"), policier or policy information, shaper information, alarm indication signal ("AIS") notifications, carrier group alarm ("CGA") notifications, fragmented frames, flow level statistics, maintenance entity information, functionality information, ping information, trace router information, loopback information, information on test frames, information on connectivity, information on synthetic frames, or label-switched path ("LSP") OAM channel tunnel status information.

8. The method of claim 1, further comprising: generating, with a VM management agent of the one or more VM management agents, at least one second OAM frame and at least one second state information, the at least one second state information comprising information associated with at least one of state of the VM management agent, state of the one or more VM management agents, state of network connectivity, or state of at least one VM of the one or more VMs; and sending, with the VM management agent, one or more of the at least one second OAM frame or the at least one second state information to the orchestration agent.

9. A method, comprising:
communicating through an orchestration agent running on a host computing system, by a VM of one or more VMs, with a far-end or near-end OAM server function;
generating, with a virtual machine ("VM") management agent of one or more VM management agents that are running on a host computing system and that are separate from one or more VMs on which one or more virtualized applications are being run, one or more operations, administration, and management ("OAM") frames and one or more state information;
sending, with the VM management agent, at least one of the one or more OAM frames or the one or more state information to an orchestration agent running on the host computing system;
determining, with the VM management agent, whether at least one OAM frame of the one or more OAM frames has changed in response to a change in address of the at least one of far-end or near-end OAM server functions associated with a VM of the one or more VMs; and
updating, with the VM management agent, a mapping of the at least one of far-end or near-end OAM server functions associated with the at least one OAM frame that has changed with corresponding at least one VM of the one or more VMs, without restarting any of the at least one VM, the VM management agent, the one or more VM management agents, or the host computing system, based on a determination that at least one QAM frame of the one or more QAM frames has changed; and
continuously updating, with the VM management agent, a mapping of the at least one of far-end or near-end OAM server functions associated with any further OAM frames that have changed, without restarting any of the at least one VM, the VM management agent, the one or more VM management agents, or the host computing system.

10. The method of claim 9, wherein the one or more state information comprises information associated with at least one of state of the VM management agent, state of the one or more VM management agents, state of network connectivity, or state of at least one VM of the one or more VMs.

11. The method of claim 9, wherein the one or more OAM frames comprise at least one of one or more Ethernet OAM frames, one or more Internet protocol/multiprotocol label switching ("IP/MPLS") OAM frames, one or more MPLS OAM frames, or one or more two-way active measurement protocol ("TWAMP") OAM frames.

12. The method of claim 9, wherein each of the one or more VM management agents is configured to perform a multi-layer OAM monitoring function.

13. A method, comprising:
communicating through an orchestration agent running on a host computing system, by a VM of one or more VMs, with a far-end or near-end OAM server function;
determining, with a virtual machine ("VM") management agent of one or more VM management agents that are running on a host computing system and that are separate from one or more VMs on which one or more virtualized applications are being run, whether one or more operations, administration, and management ("OAM") frames have changed in response to a change in address of the at least one of far-end or near-end OAM server functions associated with a VM of the one or more VMs; and
updating, with the VM management agent, a mapping of the at least one of far-end or near-end OAM server functions list associating associated with the at least one first OAM frame that has changed with corresponding at least one VM of the one or more VMs, without restarting any of the at least one VM, the VM management agent, the one or more VM management agents, or the host computing system, based on a determination that at least one first QAM frame of the one or more first QAM frames has changed; and
continuously updating, with the VM management agent, a mapping of the at least one of far-end or near-end OAM server functions associated with any further OAM frames that have changed, without restarting any of the at least one VM, the VM management agent, the one or more VM management agents, or the host computing system.

14. The method of claim 13, wherein the one or more OAM frames comprise at least one of one or more Ethernet OAM frames, one or more Internet protocol/multiprotocol label switching ("IP/MPLS") OAM frames, one or more MPLS OAM frames, or one or more two-way active measurement protocol ("TWAMP") OAM frames.

15. The method of claim 13, wherein each of the one or more VM management agents is configured to perform a multi-layer OAM monitoring function.

16. A system, comprising:
a host computing system, said host computing system comprising one or more processors, one or more hardware components, and a non-transitory computer readable medium having encoded thereon a set of instructions that, when executed by the one or more processors, causes the one or more hardware components to perform one or more operations, the set of instructions comprising:
instructions for communicating through an orchestration agent running on a host computing system, by a VM of one or more VMs, with a far-end or near-end OAM server function;
instructions for receiving at an orchestration agent one or more operations, administration, and management ("OAM") frames and one or more state information from the one or more hardware components;
instructions for sending the one or more state information to one or more virtualized applications running on one or more virtual machines ("VMs") that are running on the host computing system;
instructions for sending the one or more OAM frames to one or more VM management agents that are running on the host computing system and that are separate from the one or more VMs, the one or more VM management agents being dedicated OAM management agents;
instructions for determining whether at least one OAM frame of the one or more OAM frames has changed in response to a change in address of the at least one of far-end or near-end OAM server functions associated with a VM of the one or more VMs; and
instructions for updating a mapping of the at least one of far-end or near-end OAM server functions associated with the at least one OAM frame that has changed corresponding at least one VM of the one or more VMs, without restarting any of the at least one VM, the VM management agent, the one or more VM management agents, or the host computing system, based on a determination that at least one OAM frame of the one or more OAM frames has changed; and
continuously updating, with the VM management agent, a mapping of the at least one of far-end or near-end OAM server functions associated with any further OAM frames that have changed, without restarting any of the at least one VM, the VM management agent, the one or more VM management agents, or the host computing system.

17. The system of claim 16, wherein the set of instructions further comprise:
instructions for generating the one or more operations, administration, and management ("OAM") frames and the one or more state information associated with a virtual machine ("VM") management agent that is running on a host computing system and that is separate from the one or more VMs on which one or more virtualized applications are being run; and I
instructions for sending at least one of the one or more OAM frames or the one or more state information to the orchestration agent.

18. A system, comprising:
a host computing system, said host computing system comprising one or more processors, one or more hardware components, and a non-transitory computer readable medium having encoded thereon a set of instructions that, when executed by the one or more processors, causes the one or more hardware components to perform one or more operations, the set of instructions comprising:
instructions for communicating through an orchestration agent running on a host computing system, by a VM of one or more VMs, with a far-end or near-end OAM server function;
instructions for determining whether one or more operations, administration, and management ("OAM") frames have changed in response to a change in address of the at least one of far-end or near-end OAM server functions associated with a virtual machine ("VM") on which one or more virtualized applications are being run, the one or more VMs running on the host computing system; and
instructions for updating a mapping of the at least one of far-end or near-end OAM server functions associated with the one or more OAM frames that have changed with corresponding at least one VM, without restarting any of the at least one VM or the host computing system, based on a determination that one or more OAM frames have changed; and
continuously updating, with the VM management agent, a mapping of the at least one of far-end or near-end OAM server functions associated with any further OAM frames that have changed, without restarting any of the at least one VM, the VM management agent, the one or more VM management agents, or the host computing system.

\* \* \* \* \*